(12) United States Patent
Pyle et al.

(10) Patent No.: US 8,782,268 B2
(45) Date of Patent: Jul. 15, 2014

(54) DYNAMIC COMPOSITION OF MEDIA

(75) Inventors: Harry Pyle, Bellevue, WA (US); Robert Kilroy Hughes, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 218 days.

(21) Appl. No.: 12/938,747

(22) Filed: Nov. 3, 2010

(65) Prior Publication Data

US 2012/0023251 A1 Jan. 26, 2012

Related U.S. Application Data

(60) Provisional application No. 61/366,059, filed on Jul. 20, 2010.

(51) Int. Cl.
*G06F 15/16* (2006.01)
(52) U.S. Cl.
USPC ............ 709/231; 709/219; 709/246; 386/125
(58) Field of Classification Search
CPC ... H04L 65/4084; H04L 65/608; H04L 67/02; H04N 21/234327; H04N 21/64322; H04N 21/8456
USPC ........................... 709/231, 219, 246; 386/125
See application file for complete search history.

(56) References Cited

U.S. PATENT DOCUMENTS

| | | | |
|---|---|---|---|
| 6,704,738 B1 * | 3/2004 | de Vries et al. ....................... 1/1 | |
| 7,489,707 B2 | 2/2009 | Pung et al. | |
| 7,596,296 B2 | 9/2009 | Hendrickson et al. | |
| 7,624,350 B2 | 11/2009 | Garg et al. | |
| 2003/0140159 A1 | 7/2003 | Campbell | |
| 2005/0025469 A1 * | 2/2005 | Geer et al. ..................... 386/125 | |

(Continued)

OTHER PUBLICATIONS

Zhigang Chen, "Video and Audio: Organization and Retrieval in the WWW", Jun. 20, 2007; 13 Pages, http://choices.cs.uiuc.edu/Papers/New/www5/www5.html.*

(Continued)

*Primary Examiner* — Michael C Lai
(74) *Attorney, Agent, or Firm* — Ben Tabor; Kate Drakos; Micky Minhas

(57) ABSTRACT

The subject disclosure relates to dynamic composition including the ability to create interoperable combinations of content by the publisher, e.g., determined to be an optimal combination, and offer such combinations to client devices in an interoperable way to allow simple selection by devices without complex programming, web pages, etc. specific to each device. Compositions are dynamic in that new audio, video, subtitle, etc. tracks can be added to a given composition without changing any of the other tracks, e.g., by updating the composition's extensible markup language (XML), and new compositions can be created or removed at any time without changing any audio or video files. Interoperable and scalable "discovery" is also enabled whereby random devices can contact a Web server, find and play a composition matched to the given devices and users, e.g., optimal composition for a given device and user. Using the content identification and description format of compositions, devices can search, sort, browse, display, etc. content that is available, determine if it is compatible at the device, decode, and determine digital rights management (DRM) level, and content level.

16 Claims, 13 Drawing Sheets

(56) References Cited

U.S. PATENT DOCUMENTS

| | | | |
|---|---|---|---|
| 2005/0097008 A1* | 5/2005 | Ehring et al. | 705/26 |
| 2006/0059481 A1* | 3/2006 | Smith et al. | 717/173 |
| 2007/0005795 A1 | 1/2007 | Gonzalez | |
| 2009/0006643 A1 | 1/2009 | Lee et al. | |
| 2009/0210549 A1* | 8/2009 | Hudson et al. | 709/231 |
| 2009/0259686 A1 | 10/2009 | Figueroa et al. | |
| 2011/0173345 A1* | 7/2011 | Knox et al. | 709/246 |
| 2011/0307581 A1* | 12/2011 | Furbeck et al. | 709/219 |
| 2012/0023251 A1* | 1/2012 | Pyle et al. | 709/231 |

OTHER PUBLICATIONS

"Working with Time-Based Media", Published Date: Apr. 30, 2008; 6 pages; http://ditra.cs.umu.se/jmf2_0-guide-html/jmftbm.html.*

"Working with Time-Based Media", Published Date: Apr. 30, 2008; 6 pages; http://ditra.cs.umu.se/jmf2 0-guide-html/jmftbm.html.

Zhigang Chen, "Video and Audio: Organization and Retrieval in the WWW", Published Date: Jun. 20, 2007; 13 Pages, http://choices.cs.uiuc.edu/Papers/New/www5/www5.html.

* cited by examiner

DYNAMIC COMPOSITION OF MEDIA

CROSS-REFERENCE TO RELATED APPLICATIONS

This application claims priority to U.S. Provisional Application Ser. No. 61/366,059, filed on Jul. 20, 2010, entitled "DYNAMIC COMPOSITION OF MEDIA FOR DEVICES", the entirety of which is incorporated herein by reference.

TECHNICAL FIELD

The subject disclosure relates to dynamic composition of media for streaming to consuming devices.

BACKGROUND

Existing solutions for composing media and streaming to devices either do not allow for independent combination of media files at all because they require single files containing a permanently fixed set of tracks, or require non-standardized and proprietary methods to combine independent tracks available on the server, which limit widespread industry implementation and adoption due to the closed nature of such systems.

For instance, with respect to digital versatile disks (DVD) and Blu-ray track formats, the tracks are provided as a single file containing many tracks, thus limiting flexibility and usability since in order to decode any portion of the data included in the DVD or Blu-ray, the entire file typically must be present. A single monolithic file for content, while acceptable in terms of delivery by way of physical discs, is not very efficient in terms of streaming, and thus severely limits content streaming solutions.

For another example, media presentation description (MPD) and other adaptive streaming solutions that switch entire files cannot independently switch tracks, so are, in practicality, limited to switching only video bitrates, or a few other attributes. This is so because of a "combinatorial complexity problem." For instance, a content provider who desires to make a feature length film available via adaptive streaming generally must previously encode a different file for all the combinations that will be utilized for the set of clients. However, a typical movie may require multiple video resolutions, camera angles, video bitrates, audio channels, supported languages, descriptive audio tracks and closed captioning languages. Every combination represents a separate muxed version of the movie, leading to the aforementioned combinatorial complexity problem.

For example, a movie with eight audio tracks to cover different language and codecs, two caption streams, and two video angles, would result in 8×2×2×8=256 separate, multiplexed or "muxed" versions of the movie (e.g., 256 different representations of the same content), each of which is be stored on content servers to allow subsequent streaming. Moreover, this problem becomes greater when the content is to be HTTP Live adaptive streaming with six quality levels broken up into ten-second segments. A two hour movie becomes 256×720=138,240 files (e.g., 120 minutes and 6 chunks per minute=720 chunks per movie). Further still, the illustrated example provides only a few options for a client to choose, in particular, a client can choose between eight languages, two caption streams, and two video angles. In order to give the client more options and/or to adapt to a wider set of client devices, network conditions, and user preferences, the number of fixed muxed representations of the content grows exponentially.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, dynamic composition is enabled, which relates to the ability to create interoperable combinations of content by the publisher, e.g., determined to be an optimal combination, and offer such combinations to client devices in an interoperable way to allow simple selection by devices without complex programming, web pages, etc. specific to each device. Compositions are dynamic in that new audio, video, subtitle, etc. tracks can be added to a given composition without changing any of the other tracks, e.g., by updating the composition's extensible markup language (XML), and new compositions can be created or removed at any time without changing any audio or video files.

In various non-limiting embodiments, interoperable and scalable "discovery" is also enabled whereby random devices can contact a Web server, find and play a composition matched to the given devices and users, e.g., optimal composition for a given device and user. Using the content identification and description format of compositions, the devices can search, sort, browse, display, etc. content that is available, determine if it is compatible at the device, decode and determine digital rights management (DRM) level, and content level (such as compatible language, optimum display resolution e.g. not 240 line video on a 1080 line screen, stereo for headphones, multichannel for a surround sound system, etc.).

In one or more embodiments, presentations can be initialized on devices based on track set information that provides information on the set of tracks available for playback in a selected composition.

Compositions enable flexible selection between multiple wire formats for compatibility with more devices (e.g., some devices are limited to MPEG-2 Transport Streams, MP4 multiplex files, or protected interoperable file format (PIFF) Fragmented international organization for standardization (ISO) Base Media files, and so on).

In this regard, compositions enable selection of new request protocols in combinations with some wire formats, such as PIFF, that eliminate the need to frequently request updates from the server. Time based Requests can use time information in the video stream that is shared by all alternate tracks in order to push information utilized for the next universal resource locator (URL) requests for an entire Switch Group or Groups sharing a common timeline. Event information can also be delivered in other ways, e.g., "sparse tracks" in Smooth Streaming Transport Protocol (SSTP).

Track sets enable a standardized way for devices to switch between tracks while streaming based on codec, resolution, camera angle, language, audio channels (e.g., 2.0, 5.1, 7.1 ch, etc.), subtitles, content type (e.g., dialog, translation, commentary, description for visually impaired, etc.). The track sets are thus formed based on, e.g., optimized for, streaming with the selected tracks downloaded, as opposed to being a single file containing many tracks, such as in the case of DVD and Blu-ray track formats.

These and other embodiments are described in more detail below.

BRIEF DESCRIPTION OF THE DRAWINGS

The system and methods for representing synchronization knowledge and/or partial knowledge for multiple nodes sharing subsets of a set of information are further described with reference to the accompanying drawings in which.

DETAILED DESCRIPTION

Overview

Figure 1:
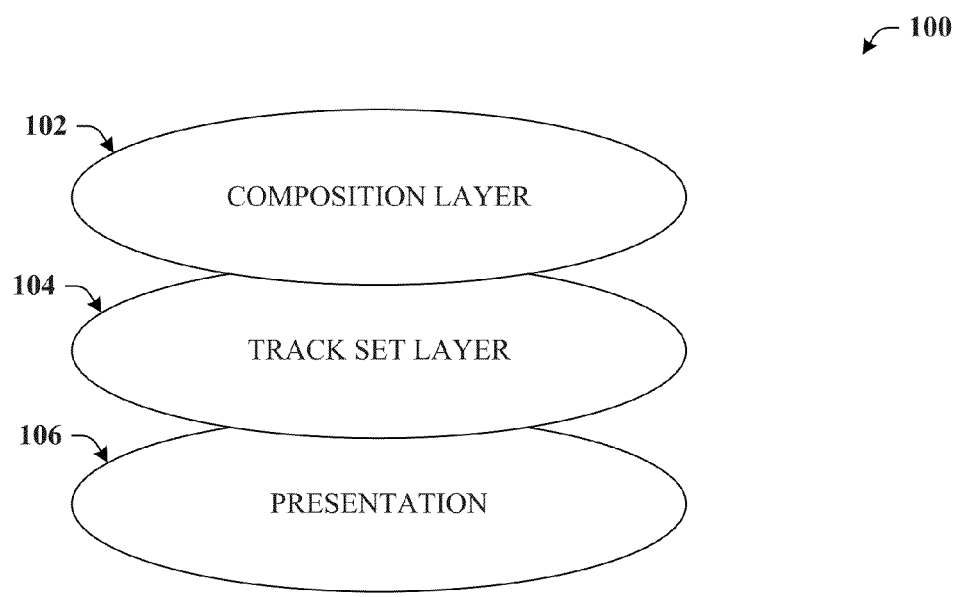
FIG. 1 illustrates a logical hierarchy of various layers employed for adaptive streaming.

By way of an introduction, the subject matter disclosed herein relates to various embodiments for hypertext transfer protocol (HTTP) streaming of content. As such, the disclosed subject matter can describe a next generation smooth streaming transport protocol with a client manifest expressed in terms of the Third Generation Partnership Project (3GPP) Media Presentation Description (MPD) (TS 26.234), with various enhancements. These enhancements can, e.g., solve or mitigate the combinatorial complexity problem associated with adaptive streaming of content as well as provide for, e.g., improved independent track storage and addressing, a common encryption for Digital Rights Management (DRM) interoperability, support for real-time/live trans-multiplexing to alternate wire formats, or improved support for efficient live streaming to name but a few.

Mitigating the combinatorial complexity problem for any adaptive streaming approach will ideally support storage of tracks in separate files, permitting a client to combine tracks without the service provider being required to produce a separate muxed version of the content for each combination. Rather, certain portions of the content can be reused for composing the versions requested by the client. Likewise, the standardized encoding format need not require all tracks to be in the same file. Instead, such encoding format can support independent track storage and combination.

Advantageously, subject matter disclosed herein can be compatible with ISO/IEC 13818-1 and ISO/IEC 14496-12 and can therefore be fully compliant with the capabilities to work with both Motion Picture Experts Group Transport Stream (MPEG-2 TS) and fragmented MPEG-4 (MP4) files. Various embodiments can employ a file system or structure based on Protected Interoperable File Format (PIFF) code point of the ISO based media file format (ISOFF), which provides numerous inherent advantages that can be leveraged, including, e.g., independent track storage and addressing as well as DRM interoperability. By leveraging DRM-interoperable encoding, a variety of improvements over other MP4 encodings can be realized.

In more detail, it can be presumed that content protection or DRM will continue to be utilized for some video content. For a variety of business and technical reasons, different original equipment manufactures (OEMs) will show a preference for different DRM systems. Perhaps more importantly, the notion of a "DRM Standard" is misleading, since all DRM systems require a license agreement, with compliance and robustness rules, and a certificate infrastructure. In other words, DRM systems are implemented as part of a business proposition, and as such remain proprietary.

For these and other reasons, DRM interoperability is likely to be employed for any adaptive streaming system which intends to target a broad range of consumer electronic devices. This type of interoperability is most easily accomplished by establishing a common encryption mechanism, along with a generic way of signaling multiple DRM support for the file or stream. Advantageously, these features have been implemented in PIFF. The common encryption and signaling mechanism defined in PIFF has been adopted by the Digital Entertainment Content Ecosystem (DECE), and has been proposed for standardization in the ISO MPEG file format working group, but as yet has not been adopted by conventional streaming systems or providers.

Furthermore, it is to be understood that a difference exists between a particular storage format and typical wireline formats used for adaptive streaming. For example, many devices are restricted to receive content in a specified wireline format. If the native storage format of the adaptive streaming technology lends itself to be used with multiple wireline formats, by permitting real-time/live trans-muxing and trans-encapsulation into alternative wireline format, then such can result in a format that is much more practical and/or efficient in a heterogeneous deployment environment, such as an adaptive streaming environment.

Today, HTTP Streaming depends on the existence of a manifest file to inform the client what media elements are available. In the 3GPP specification, this manifest is called the Media Presentation Description (MPD), and will be referred to herein as either an MPD or manifest. For live streaming to have low latency from real-time events, the MPD information is constantly updated for the client to formulate the correct uniform resource locator (URL) to obtain the latest segment of content.

Thus, the 3GPP live streaming method requires periodic requests (e.g., every few seconds for low latency) of the entire MPD file. Moreover, since this MPD file is constantly changing, it typically must have a short expiration time and thus reduced utilization of HTTP edge caching. In contrast, one of the benefits of the disclosed subject matter is that Smooth Streaming can reduce the MPD live update traffic. Such can be accomplished by employing time-based segment addressing along with segment start and duration time information in the segment wire format.

Such duration information can be utilized to update the MPD segment information for all tracks time-aligned to the track being streamed without requiring a reread the of MPD document. With this information in hand, the client can formulate time-based segment request URLs.

At the logical level, Media Description for Adaptive Streaming is a description of a set of media resources available for HTTP Adaptive Streaming (HAS), which is composed of three layers, as illustrated with reference to FIG. 1.

Referring initially to FIG. 1, illustration 100 depicts a logical hierarchy of various layers employed for adaptive streaming. At the top is a "composition" layer 102 for describing arrangements of resources suitable for various endpoint consumptions. For example, there may be one arrangement suitable for portable devices and another for personal computers, or another for a certain "wire format" (e.g. MPEG2-TS or fragmented MP4), or another for a family friendly version of the content. Some of these may be chosen automatically by the terminal while others are driven by the user interacting with player controls. It is the composition that combines an appropriate set of audio, video, and text tracks. Further detail is provided in connection with FIGS. 2 and 3, infra.

Below the composition layer 102 is the "track set" layer 104 for describing the various media component tracks available as alternatives both for adapting to network and client conditions, and for user choice. These sets are separated into those that are "seamlessly switchable" those that are "selectable" but can result in a non-seamless transition. Generally, a given track set deals with a single media component type. For more detail in connection with track sets, see FIG. 4.

Next, below the track set layer 104 is the "presentation" layer 106 for describing periods of contiguous representations of media segments available as HTTP resources for incremental streaming. It is underscored that the segmented nature of these representations allows the streaming to be adapted to varying network and client conditions. This layer has descriptive information for all the tracks, including declaration of which tracks are switchable. Additional detail with respect to these features can be found with reference to FIGS. 5 and 6.

With respect to compositions and track sets, dynamic composition can relate to the ability to create interoperable combinations of content determined to be optimal by the publisher and offer them to client devices in an interoperable way to allow simple selection by devices without complex programming, web pages, etc. specific to each device. Compositions are dynamic in the sense that new audio, video, subtitle, etc. tracks can be added without changing any of the other tracks just by updating the Composition XML, and new Compositions can be created or removed at any time without changing any audio or video files.

In contrast, existing solutions require some non-standardized method to combine independent tracks available on the server, or do not allow for independent combination because they require single files containing a permanently fixed set of tracks.

Terminology

In order to simplify explanation of the disclosed subject matter and to further ensure conceptual understanding, the following terms are provided exemplary definitions:

Adaptive bitrate streaming: A technique of dynamically varying the video bit rate to provide continuous playback at the highest quality that available bandwidth and client rendering power will support.

AVC: Advanced Video Coding.

Chunk: A contiguous set of samples for one track.

Common Content Component: A content component shared by different services, e.g. two services use the same video tracks but different audio tracks, illustrating the shared video tracks as common content components.

Composition Layer: Top layer describing arrangements of resources suitable for endpoint consumption, selecting the appropriate combination of audio, video and text tracks. See, e.g., composition layer 102. Compare 'track set' layer and 'presentation' layer.

Conformance Point: The specific profile and level of a content component that uniquely defines the decoding capabilities employed.

Content: A set of content components, e.g. a movie, a song.

Content Component: Content of a single type or a subset thereof. For example, a video track, an audio track, movie subtitles, or an enhancement layer of video.

Delivery: Transport of content components to a defined end point.

HAS: HTTP Adaptive Streaming.

ISO Base Media File: File format defined in reference ISOFF (ISO 14496-10).

Media Component: Media components are an encoded version of one individual media type, such as audio, video or timed text. Media components are time-continuous across boundaries of consecutive media segments within one representation.

MPD: Media Presentation Description

MPEG-2 TS: Motion Picture Experts Group Transport Stream.

Partial Representation: The disclosed subject matter modifies the definition of partial representation from that defined in 3GPP MPD. In 3GPP, a partial representation is permitted to be more than one track. As used herein, a partial representation can be one and only one track. See Representation, Period.

Period: Consistent with the 3GPP MPD definition, each period consists of one or more representations. See representation, partial representation.

Presentation: Operation performed by one or more devices that allows a consumer to experience the content, e.g. view a movie or listen to a song.

Presentation Layer: Bottom layer describing periods of contiguous representations of media segments. See e.g., presentation layer 106.

Progressive download: Download where presentation is started before the delivery is completed.

Random Access: Starting a presentation at an arbitrary point.

Representation: The disclosed subject matter generally defines a representation in the same way as the 3GPP MPD does. A Representation is one of the alternative choices of the media content, typically the encoding choice. A representation starts at the beginning of a Period and extends to the end of the Period. Each representation consists of one or more media components. See media component, partial representation, segment, and period.

Segment: The subset of one or more content components within a single time interval.

Selectable Set: Track sets which are "selectable" but result in a non-seamless transition. Typically, a given track set deals with a single media component type. Compare Switchable Set.

Service: The delivery of one or more content components for presentation or storage.

Service Information: Metadata describing a service, its characteristics and components.

Splicing: The concatenation of two different content components of the same media type, e.g., concatenation of two audio components or two video components.

Storage: Long-term recording of any portion of one or more content components, in a way making content components available for delivery and/or presentation.

Streaming: Incremental transfer of content or portions thereof at a rate sufficient to meet the needs of continuous presentation.

Switchable Set: Track sets which are "seamlessly switchable". Typically, a given track set deals with a single media component type. See Selectable Set.

Track Set Layer: A Middle layer above presentation and below composition describing various alternatives for tracks. Can includes both switchable and selectable track sets. E.g., track set layer 104. Compare 'composition' and 'presentation'.

Trick Modes: Presentation of one or more content components at an arbitrary speed in either temporal direction, e.g. fast forward or fast rewind.

In addition, it is to be noted that, as used herein the terms "content" and "media" can be used substantially interchangeably. However, it is to be understood that distinctions can be evident. For example, content can relate specifically to data configured for storage, whereas media can relate specifically to (the same) data configured and/or encoded for presentation.

Dynamic Composition of Content and Related Features

Figure 2:
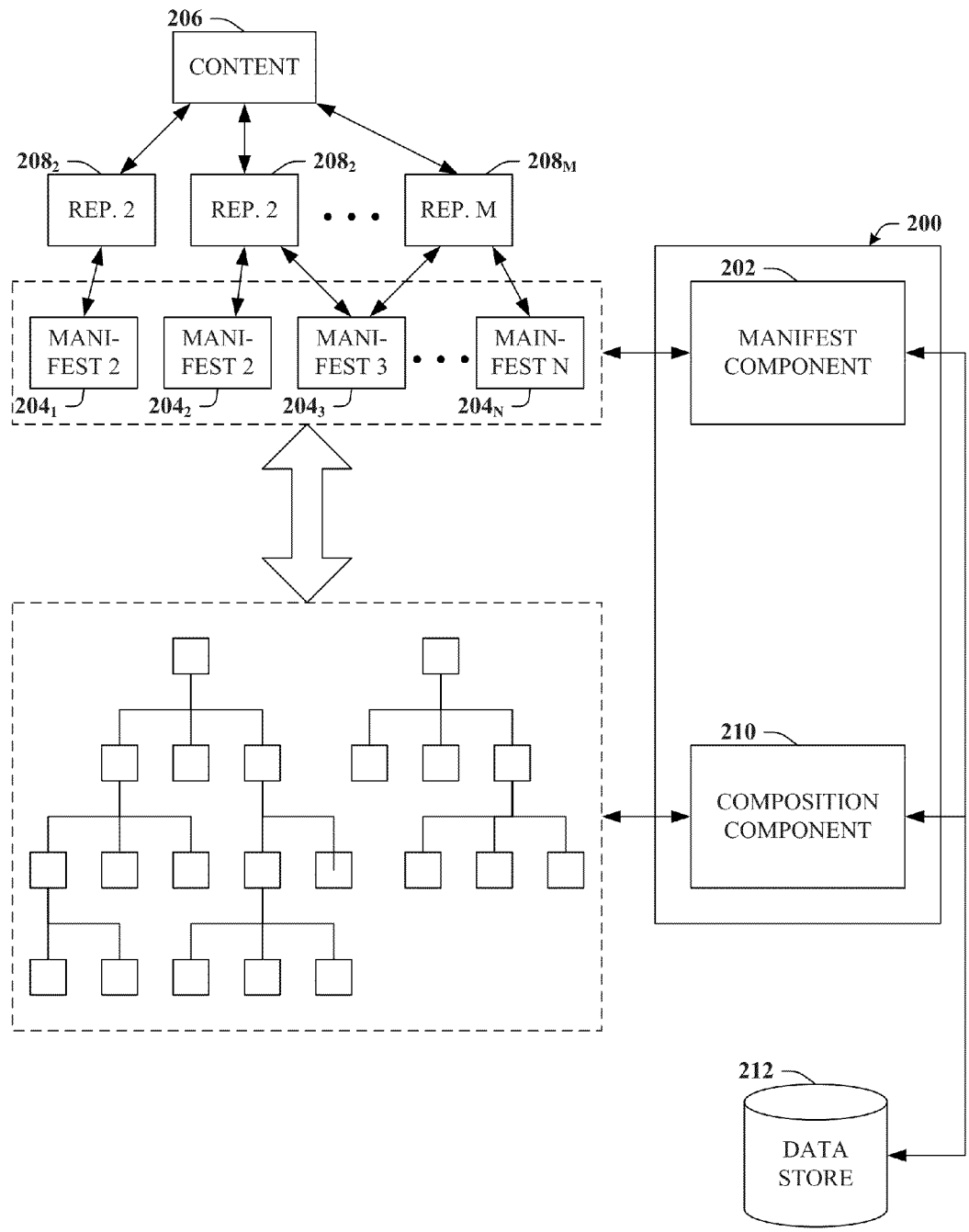
FIG. 2 illustrates a block diagram of an exemplary non-limiting system that can facilitate hypertext transfer protocol (HTTP) delivery of streaming media.

Referring now to FIG. 2, system 200 that can facilitate hypertext transfer protocol (HTTP) delivery of streaming media is depicted. In general, system 200 can include manifest component 202 that can be configured to maintain multiple manifests $204_1$-$204_N$ for a single item of content 206. By way of example, content 206 can be substantially any type of content, such as a movie, song, or another media production, that is suitable for delivery to or presentation at endpoints of a streaming network. As illustrated, content 206 can be associated with various representations $208_1$-$208_M$ of that content 206, such as, e.g., different representations based upon different bitrates, resolutions, languages, or even an original theatrical version versus a PG-13 version, or substantially any other suitable attribute. Accordingly, it is to be understood that while only a single item of content 206 (e.g., a single movie or song) is depicted, other content 206 could exist, and each item of content 206 can have multiple representations $208_1$-$208_M$ as well as multiple manifests $204_1$-$204_N$, where M and N can be any substantially positive integer. Moreover, it is to be understood that representations $208_1$-$208_M$ and manifests $204_1$-$204_N$ can be referred to herein, either collectively or individually as representation(s) 208 or manifest(s) 204, respectively, with appropriate subscripts employed generally only when instructive or convenient to highlight various distinctions or to better impart the disclosed concepts.

Typically, a given manifest 204 will be an extensible markup language (XML) document that describe at least one location of one or more content segment associated with one or more representation 208 of content 206. In addition, manifest 204 can further include other data such as attributes associated with content 206 or various representations 208 thereof, which is further detailed infra. However, it is to be appreciated that conventional streaming systems maintain only a single manifest, that typically only describes locations of stored files. As a result, conventional streaming systems are subject to the combinatorial complexity problem, and moreover do not provide for individual track addressability, are generally more limited by the file system format, as well as a host of other shortcomings.

For example, manifest 204 can describe the locations of various content segments, which can appear to a presentation device as a large set of small-interval content files, say 5 seconds or so. Nevertheless, the actual storage of content 206 can be in much larger files that are cross-indexed into chunks, which can illustrate a degree of independence from the structure of the file system. Furthermore, by employing multiple manifests 204, individual manifests 204 can be optimized for particular delivery formats, wire formats, endpoint profiles or configurations, client preferences, and so forth, which are further discussed herein.

Figure 3:
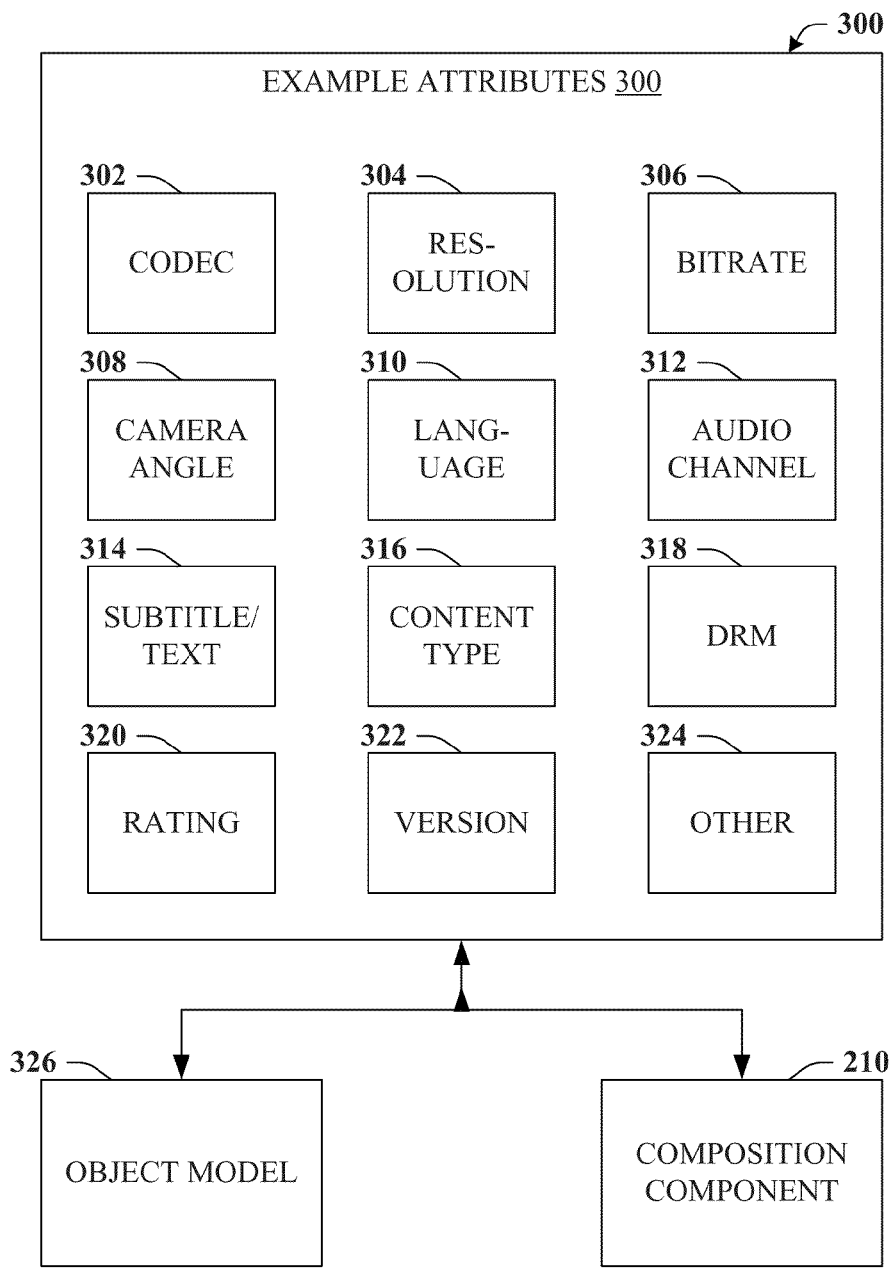
FIG. 3 illustrates exemplary non-limiting example attributes various attributes.

Moreover, system 200 can also include composition component 210, which, as with other components described herein, can be in a computer-readable storage medium. Composition component 210 can be configured to organize the multiple manifests 204 in accordance with descriptions of the multiple manifests 204. For example, the multiple manifests 204 can be described based upon a set of attributes associated with one or more representation 208 and/or content 206. Thus, composition component 210 can organize manifests 204 in a hierarchical manner or otherwise, which can be based upon the various attributes, e.g., based upon a priority of the attributes or substantially any suitable scheme. FIG. 3 illustrates various example attributes that can be employed by composition component 210 as well as other components detailed herein.

While still referring to FIG. 2, but turning now as well to FIG. 3, example attributes 300 are illustrated. It is to be understood that the examples provided herein are intended to be non-limiting, while providing a wide range of concrete examples. Accordingly, attributes 300 can be based upon, e.g., codec 302 that is employed to encode and/or decode a particular data stream associated with content 206. Likewise, attributes 300 can relate to resolution 304 that is employed or recommended for a particular presentation of a given representation 208. As another example, attributes 300 can be based upon bitrate 306, or a number of bits delivered per unit of time.

Various other example attributes 300 can be camera angle 308 (e.g., some content can provide different perspectives), language 310 (e.g., English, French, Spanish, etc.), audio channel 312 (e.g., 2.0, 5.1, 7.1, etc.), subtitles 314 or other text as well as various languages for the text, content type 316 (e.g., whether the content relates to dialog, translation, commentary, description for visually impaired, etc.), DRM 318 (e.g., the particular DRM system employed for encryption/decryption), rating 320 (e.g., a Motion Pictures Association of America (MPAA) rating such as "R" or "PG-13", or similar), version 322 (e.g., a live version, a remixed version, theatrical version, free version with no encryption but with advertisements, etc.), as well as other suitable attributes 324.

In one or more aspects, composition component 210 can be further configured to organize the multiple manifests 204 in accordance with object model 326 that defines a set of attributes, such as attributes 300, associated with one or more representation 208 of content 206 or content segment thereof. Hence, in addition to maintaining multiple manifests 204 that can be optimized according to substantially any arbitrary configuration (e.g., manifest A for high-definition presentation and manifest B for standard-definition presentations), object model 326 can be optimized for particular streaming content providers.

For example, consider content provider ABC who specializes in providing high-definition presentations 208 in connection with a proprietary codec and a fixed resolution, while content provider XYZ specializes in a wide range of different types of content 206 delivered to a very broad set of different devices, ranging from HD-TVs to mobile phones of limited form factor. Provider XYZ might hierarchically organize the multiple manifests 204 different than would provider ABC. Moreover, the two providers are likely to categorize track sets differently in terms of switchable or selectable (detailed with respect to FIG. 4). Yet, both providers can be afforded the opportunity to optimize and/or prioritize according to a respective business model or other parameters deemed to be useful.

Still referring to FIG. 1, it is to be noted that information described in connection with FIG. 2 as well as other portions of this disclosure can be stored to data store 212 for later access or recall. For example, manifest component 202 can maintain manifests 204 in data store 212 and composition component 210 can organize these manifests 204 based upon logic that resides in data store 212. In particular, data store 212 is intended to be a repository of all or portions of data, data sets, or information described herein or otherwise suitable for use with the described subject matter. Data store 212 can be centralized, either remotely or locally cached, or distributed, potentially across multiple devices and/or schemas. Furthermore, data store 212 can be embodied as substantially any type of memory, including but not limited to volatile or non-volatile, sequential access, structured access, or random access, solid state, and so on. It is to be understood that all or portions of data store 212 can be included in system 200 (or other), or can reside in part or entirely remotely from system 200.

Figure 4:
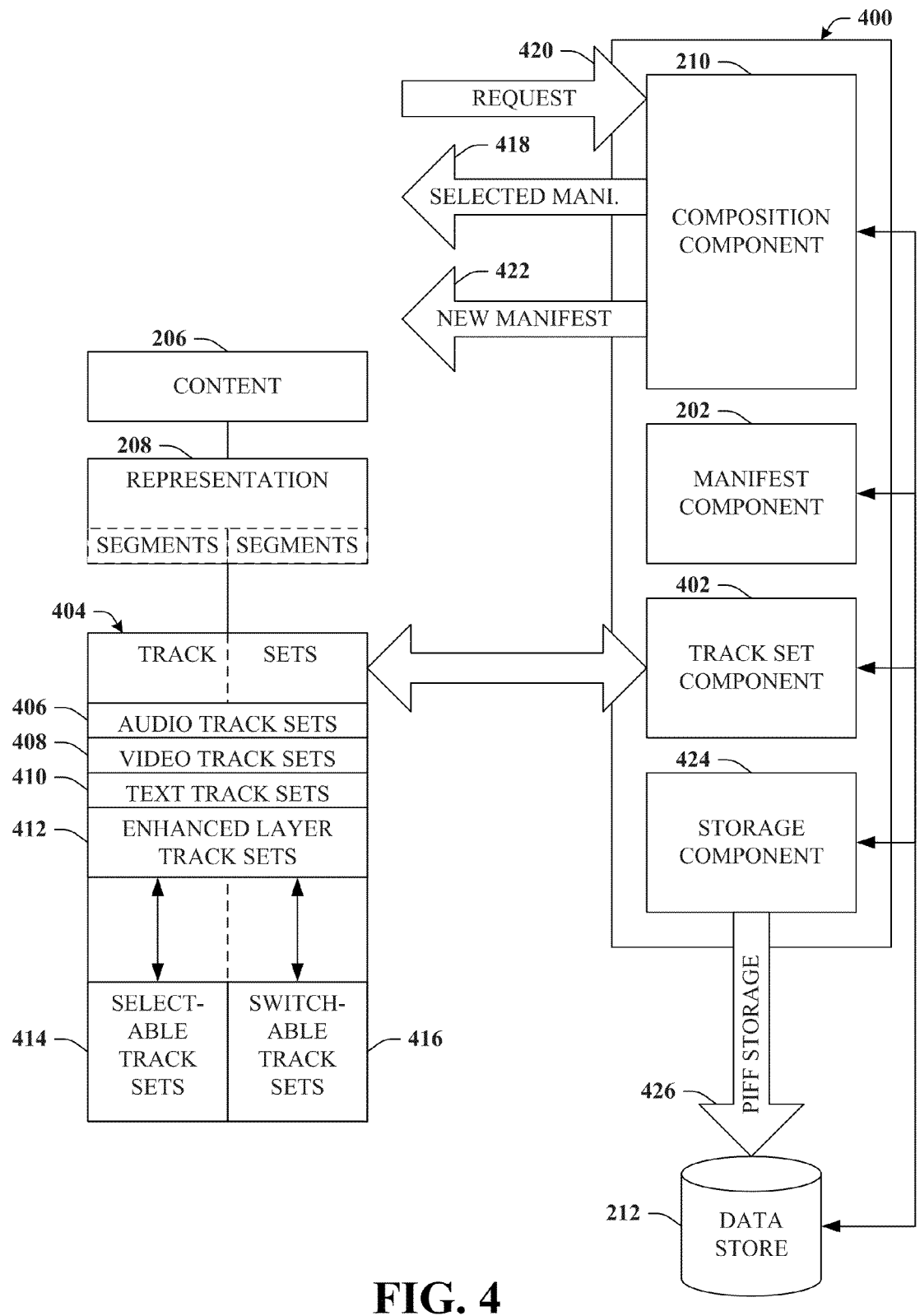
FIG. 4 is block diagram of an exemplary system that illustrates additional features or aspect in connection with HTTP delivery of streaming content.

Referring now to FIG. 4, system 400 that illustrates additional features or aspect in connection with HTTP delivery of streaming content is provided. Briefly, system 400 can include manifest component 202 that can be configured to maintain multiple manifests 204; as well as composition component 210 that can be configured to organize the multiple manifests 204 in accordance with descriptions of the multiple manifests 204, as substantially detailed supra in connection with FIG. 2.

In addition, system 400 can further include track set component 402 that can be configured to identify track sets 404 available as alternative representations 208 of content 206 or content segments thereof. In one or more aspect, a given track set 404 can be associated with one and only one content type. In other words, a particular track set 404 can relate to a single content type such as, e.g., audio, video, subtitles or other text, or an enhanced layer of video or audio. Thus, various track sets can include audio track sets 406, video track sets 408, text track sets 410, enhanced layer track sets 412, and so on.

Furthermore, in one or more aspect, all or a portion of the various track sets 404 can be classified as one of a selectable track set 414 or a switchable track set 416. For example, selectable track sets 414 can be selected prior to delivery, and therefore typically result in non-seamless transition when transitioning between various selectable track sets 414. On the other hand, switchable track sets 416 can be seamlessly switchable with respect to another switchable track set 416 during presentation. Accordingly, although no attribute(s) 300 is necessarily always either a selectable attribute or a switchable attribute, certain attributes 300 are more conducive to one or the other in connection with adaptive streaming. For example, often it can make sense to have attributes such as codec 302, resolution 304, and DRM 318 to be selectable at the outset, whereas attributes such as bitrate 306, camera angle 308, and subtitle 314, which are more likely to be altered during presentation. Thus, track sets 404 at, say, a first resolution can be selectable with respect to track sets 404 at a different resolution, where as track sets 404 at particular bitrate can be seamlessly switchable to track sets 404 at a different bitrate. Regardless, a content provider can configure certain track sets 404 to be one or the other of selectable track sets 414 or switchable track sets 416, which provides additional functionality for both the content providers and the content consumers.

In one or more embodiment, composition component 210 can be further configured to select a particular selected manifest 418 from the set of available manifests 204 based upon data included in a request 420 for content 206. Accordingly, selected manifest 418 can be transmitted to a requesting device. For example, consider once more the case in which content 206 is a movie. The requesting device (not shown) can be, e.g., a HD television with very large form factor. The HD television can further be configured to only present media that is rated PG-13 (unless parent codes are entered) and is coupled to a reliable network with high bandwidth in an English-speaking household. On the other hand, as a second example, the requesting device can be a smart phone with a more modest form factor and resolution support, and is currently in transit at high speeds resulting in a less reliable network connection. Furthermore, the default language for the smart phone is set to German, and as a user preference indicates hearing impairment.

Although both requesting devices can request the very same movie (e.g., same content 206), it is readily apparent that these two distinct devices and/or configurations or preferences, will not demand the same representation 208 of that movie. Rather, whereas the television might request a HD version with high resolution and surround sound with the PG-13 version and English language settings; the smart phone might request a low-resolution version with no audio and German subtitles. Furthermore, given that manifests 204 can be optimized to comport with different classes of media consumers, it is also apparent that selected manifest 418 will also differ in the example scenario above when the HD television is the requesting device than when the smart phone is the requesting device. Thus, composition component 210 can examine data included in request 420 and determine a suitable or optimal manifest, and select and transmit that manifest to the requesting device.

Moreover, in one or more embodiment, composition component 210 can be further configured to facilitate composition of new manifest 422, which can be stored amongst other manifests 204. Such new manifests 422 can be composed, e.g., based upon a set of attributes that correspond to features of one or more track sets identified by track set component 402. For example, a content provider can compose new manifest 422 specifically tailored to, e.g., track sets that receive the most requests, deliveries, and/or presentations. Furthermore, new manifest 422 can be optimized in connection with delivery or presentation based upon at least one of (1) a particular device or particular devices or capabilities thereof (e.g., optimized for presentation on tablets versus televisions versus handhelds and so forth); (2) a particular form factor (e.g., display size or other user interface or I/O features); (3) a particular network or network conditions (e.g., bandwidth, latency, quality of service, etc.); or (4) a particular setting or preference or a particular set of settings or preferences (e.g., French-speaking, hearing impaired, ratings-based content block . . . ).

In addition, system 400 can further include storage component 424 that can be configured to maintain at least one representation 208 of content 206 or a content segment thereof. Furthermore, in one or more embodiment, the at least one representation 208 can include at least one partial representation defined as a single track. Moreover, storage component 424 can be further configured to store the at least one representation 208 in a manner that supports addressability of individual partial representations or individual tracks of content 206. Still further, storage component 424 can support independent access to content component types associated with content 206. As such, partial representations and/or single tracks can be individually addressable, and thus, arbitrarily combinable with other tracks to provide a virtually unlimited number of combinations of content 206 without requiring each combination to be stored as a different entity. Additionally, various content component types (e.g., audio as a first content component type, and video as a second content component type) can be arbitrarily combinable as well.

Moreover, in one or more embodiment, storage component 424 can store representations 208 or other content by way of protected interoperable file format (PIFF) as illustrated by reference numeral 426. However, it is to be appreciated that regardless of the nature of data storage with respect to content 206, the locations of such can be specified or described by a URL included in one or more manifest 204. Moreover, a further advantage of the disclosed subject matter rests in an addressing scheme that can be reliably predicted by requesting devices, which can reduce the number of manifest request from clients to server observed in conventional systems. For example, the URL can be determined as a function of at least one of a track set 404 (e.g., the next contiguous track set), an attribute associated with the content 206, a particular content segment, or a particular track (e.g., attribute naming convention), or a time associated with content 206, a particular content segment, or a particular track.

Figure 5:
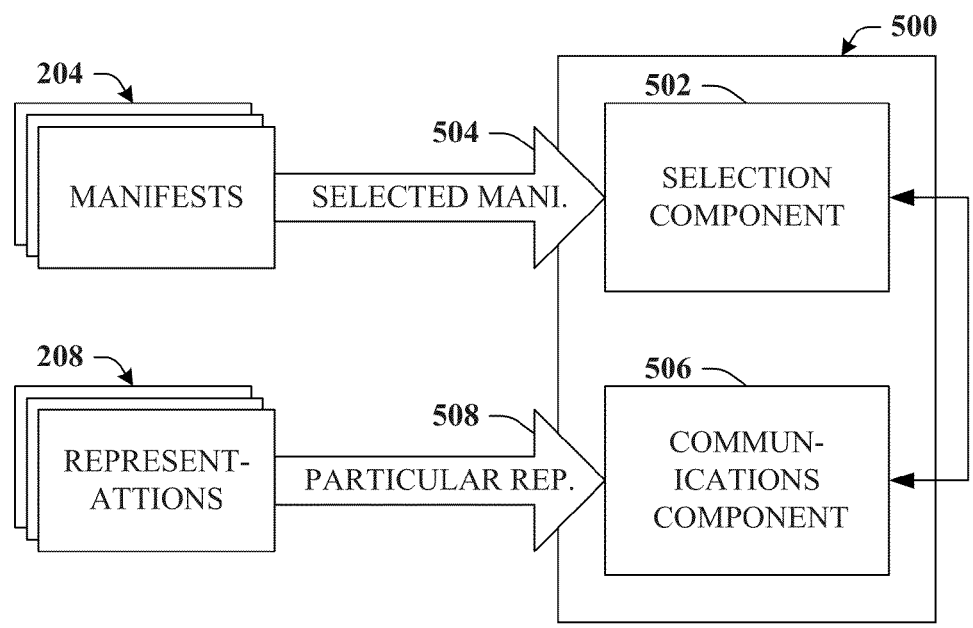
FIG. 5 is block diagram of an exemplary system that can facilitate presentation of streaming content delivered by way of HTTP.

Turning now to FIG. 5, system 500 that can facilitate presentation of streaming content delivered by way of HTTP is illustrated. Generally, system 500 can include selection component 502 that can be included in a computer-readable storage medium, as with other suitable components described herein. Selection component 502 can be configured to receive selected manifest 504 that is selected from amongst multiple manifests 204. Selected manifest 504 can describe at least one location of one or more content segments associated with a particular representation 508 of content 206. Thus, selected manifest 504 can be substantially similar to selected manifest 418 described in connection with FIG. 4.

In addition, system 500 can further include communications component 506 can be configured to retrieve particular representation 508 according to a streaming protocol based upon information included in selected manifest 504. Hence, even though many representations 208 of content 206 can exist, particular representation 508 can be a more suitable representation based upon the configuration of a presentation device associated with system 500, capabilities, limitations, or a current state of the presentation device or an associated network, as well as settings or preferences input by users of the presentation device.

Figure 6:
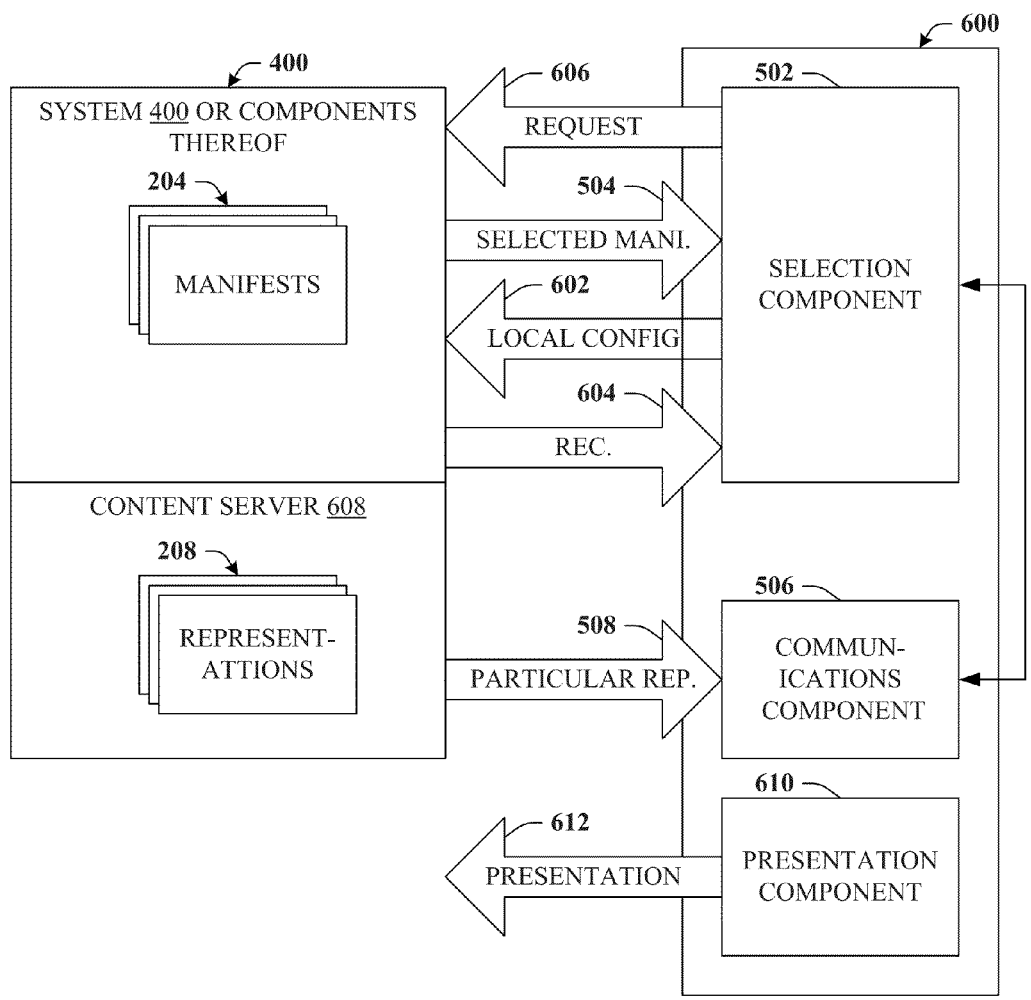
FIG. 6 is a block diagram of an exemplary system that can provide additional features or aspects in connection with presentation of HTTP streaming content.

Referring now to FIG. 6, system 600 illustrates additional features or aspects in connection with presentation of HTTP streaming content. As with system 500 of FIG. 5, system 600 can include selection component 502 that can be configured to receive selected manifest 504 and communications component 506 that can be configured to retrieve particular representation 508, as previously detailed. In one or more embodiment, selection component 502 can determine selected manifest 504 based upon local configuration 602. Local configuration 602 can relate to at least one of device or network configuration, device or network state, device or network settings or preferences, an indication of options, features, or attributes in connection with content 206, or the like. Additionally or alternatively, selection component 502 can determine selected manifest 504 based upon recommendation 604 received in response to request 606. Request 606 can include a request for specific content 206, as well as all or a portion of local configuration 602, which can be employed for determining a suitable representation (e.g., particular representation 508) of content 206. Appreciably, request 606 can be transmitted to composition component 210 or another suitable component of system 400, or a comparable system or component. Likewise, selected manifest 504 can be received from system 400 or a comparable system or components. Typically, particular representation 508 can be received from content server 608, which can be distinct from or included in system 400.

In other words, based upon features disclosed herein, selected manifest 504 can be determined (e.g., selected) by selection component 502 (e.g., client-side selection) or by composition component 210 (e.g., server-side selection), or a combination of both components 210 and 502. However, in any case, the requisite determination can be made based upon local configuration 602, which can represent a state, setup, or preferences associated with a presentation device and/or media consumption endpoint.

In addition, system 600 can further include presentation component 610 that can be configured to present at least a portion of particular representation 508, which is illustrated by presentation 612. Furthermore, in one or more embodiment, presentation component 610 can be further configured to support real-time seamless switching of tracks associated with presentation 612 of content 206 or particular representation 508. Such switching of tracks can be based upon received input such as, e.g., a user requesting a different camera angle or an automatic determination to lower the bitrate due to deteriorating network conditions or the like. Typically, such seamless switching of tracks will rely upon a switchable track set 416 designation during composition of the particular representation 508, as detailed herein.

Figure 7A:
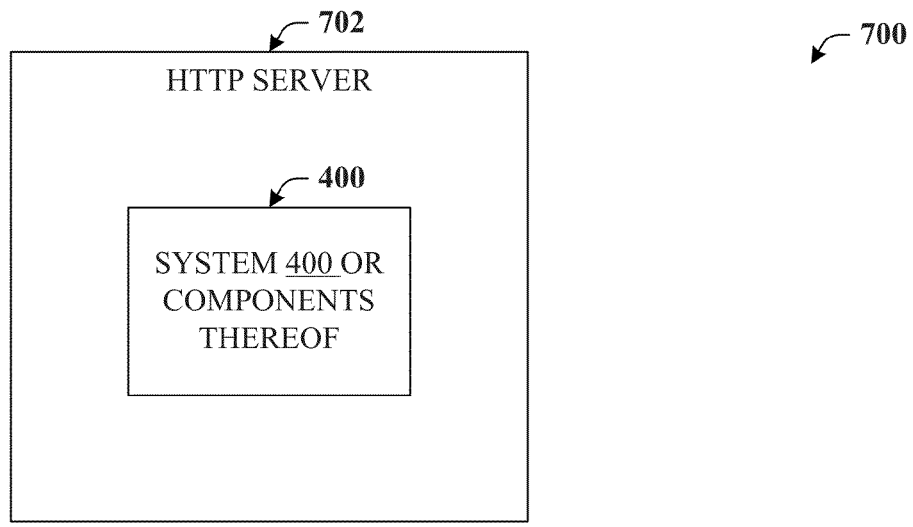
FIG. 7A is a block diagram of an exemplary server embodiment of the disclosed subject matter.
Figure 7B:
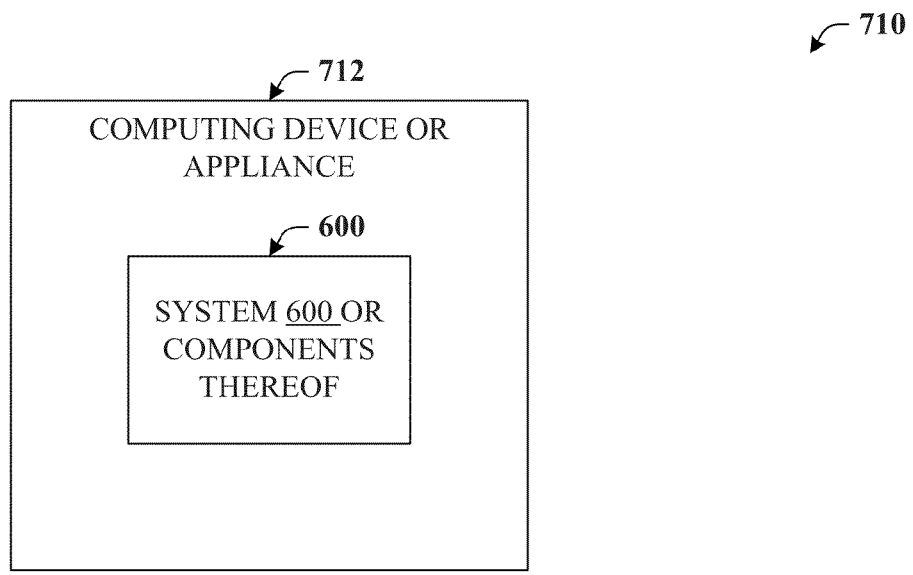
FIG. 7B is block diagram of an exemplary device or appliance embodiment of the disclosed subject matter.

Referring now to FIGS. 7A and 7B, system 700 illustrates a server embodiment of the disclosed subject matter whereas system 710 illustrates a device or appliance embodiment of the disclosed subject matter. In particular, with specific reference to FIG. 7A, system 700 can include a HTTP server 702. Furthermore, all or a portion of system 400, or related components thereof can be included in or coupled to HTTP server 702.

Likewise, with particular reference to FIG. 7B, system 710 can include a computing device or appliance 712, wherein all or a portion of system 600 or related components can be included in or coupled to computing device or appliance 712. By way of illustration, computing device or appliance 712 can be, e.g., a television, a desktop computer, a laptop, netbook, tablet, gaming console, smart phone or the like.

In accordance with what has been described above, various advantageous features or embodiments will become apparent. By employing the disclosed subject matter, dynamic composition of can be facilitated. For example, the disclosed subject matter can provide the ability to create interoperable combinations of content 206 determined to be optimal by the publisher or content provider. Such optimal interoperable combinations can then be offered to client devices in an interoperable way to allow simple selection by devices without complex programming, web pages, etc. specific to each device. Thus, compositions can be dynamic in the sense that new audio, video, subtitle, etc. tracks can be added without changing any of the other tracks just by updating the Composition XML, and new Compositions can be created or removed at any time without changing any audio or video files. In contrast, existing solutions require some non-standardized method to combine independent tracks available on the server, or do not allow for independent combination because they require single files containing a permanently fixed set of tracks.

An additional feature is interoperable and scalable "discovery". For example, random devices can contact a Web server, find and play an optimal Composition for the device and user. Using the standard content identification and description format of Compositions, they can search, sort, browse, display, etc. content that is available, determine if it is compatible at the device, decoding, DRM level, and content level (such as compatible language, optimum display resolution e.g. not 240 line video on a 1080 line screen, stereo for headphones, multichannel for a surround sound system, etc.).

Still further, presentations can be initialized on devices as a result of Track Set information that provides information on the set of Tracks available for playback in the selected Composition.

Additionally or alternatively, compositions can enable flexible selection between multiple wire formats for compatibility with more devices (i.e. some devices are limited to MPEG-2 Transport Streams, MP4 multiplex files, or PIFF Fragmented ISO Base Media files.

Furthermore, compositions can enable selection of new Request Protocols in combinations with some wire formats, such as PIFF, that eliminate the need to constantly request updates from the server. Time based Requests can use time information in the video stream that is shared by all alternate tracks in order to push the information necessary for the next URL requests for an entire Switch Group or Groups sharing a common timeline.

Track sets enable a standardized way for devices to switch between tracks while streaming based on codec, resolution, camera angle, language, audio channels (2.0, 5.1, 7.1 ch, etc.), subtitles, content type (dialog, translation, commentary, description for visually impaired, etc.). That is similar in function to DVD and Blu-ray, but optimized for streaming with only the selected tracks downloaded, not a single file containing many tracks as in the case of DVD and Blu-ray. MPD and other adaptive streaming solutions that switch entire files cannot independently switch tracks, so are in practicality limited to switching only video bitrates.

In more detail, with respect to conventional streaming content systems, there is a need to describe the composition of independent track groups into complete presentations targeting various network, device, and user capabilities and with various levels of content protection. The disclosed subject matter introduces an independent "Media Compositions Description" (e.g., manifest) document including grouping information to describe the organization of sets of track groups with attributes to facilitate selection based on usage requirements.

Figure 8:
FIG. 8 is a graphical illustration that depicts an exemplary overview of Compositions and Track Set schema.

Turning now to FIG. 8, graphical illustration 800 depicts an exemplary overview of Compositions and Track Set schema. In particular, the Compositions schema can utilize an independent list of SelectSet and SwitchSet track set elements, each with a potentially unique numeric identifier. A Composition element then contains a list of TrackSetRef elements which in turn contain "reference" elements which call out the SelectSet and SwitchSet elements by their identifier.

A SelectSet element can reference other SelectSet or SwitchSet elements while a SwitchSet element can reference other SwitchSet elements. Both SelectSet and SwitchSet elements can reference switchable track groups in a separate presentation layer description document specifying the track group numeric identifier defined in that document.

This arrangement provides the flexibility needed for different sets of elements to be described for different compositions while allowing reuse of subset descriptions rather than requiring their replication Regarding Composition, each Composition can specify the location of one or more presentation description documents which describe groups of tracks. The location URL is made up of the concatenation of the Compositions @trackGroupBaseURL, the Composition @trackGroupBaseURL, and the TrackSetRef @trackGroupURL. While all of these attributes are options, the result of the concatenation, in one or more embodiment, typically must not be empty.

The primary content in a Composition is declared with a list of TrackSetRef elements. Each one contains a @setIdRef attribute that references either a SwitchSet or SelectSet element by its @refId number. It also contains a @mediaType attribute to indicate the media component type of the tracks in the group (audio, video, subtitle, or text). In addition, the @trackGroupURL optionally adds track set specific presentation description document location information and the @trackGroupPeriodStart optionally specifies which presentation description period the track group is in when disambiguation is required.

A Composition optionally contains a @metadataURL attribute for additional metadata. The content of this resource is application dependent.

A Composition can specify which wire format (e.g., container format used for streaming) will be used when the presentation description referenced by the track sets is used. If multiple Composition elements exist, the terminal can choose those with a compatible wire format.

While a Composition can contain multiple Rating elements, it can also optionally specify a generic @isAdultContent Boolean for expressing simple originator judgment that the (possibly unrated) content is to be blocked for non-adult viewers.

The Composition Title and Copyright elements allow that information to be expressed in multiple languages.

A composition can contain any number of DefaultRef elements. These contain the values of the @refId attributes appearing in the SelectSetRef, SwtichSetRef, and TrackGroupRef elements (described below). Any set with more than one element presents a choice to make within that set. The DefaultRef value simply determines which choice to make for the given Composition Regarding Track Sets, there is a need in the domain of content streaming to describe arbitrary sets of track groups for use in varying ways in multiple Composition elements. This is facilitated by the independent listing of track group sets.

As disclosed herein, there can be two types of track sets denoted by the SelectSet and SwitchSet element complex types. These elements contain lists of "reference" elements that specify other sets or track groups in a presentation description document. The means there can be sets of sets but at the end of the path track groups, in one or more embodiment, typically must be referenced.

The SelectSetRef, SwitchSetRef, and TrackGroupRef elements contain @refId attributes for reference from the Composition DefaultRef element. The SelectSetRef and SwitchSetRef also contain @setIdRef for referencing other set elements. The TrackGroupRef also contains the @groupIdRef for referencing presentation description document track groups.

A SelectSet element can contain any of the above reference elements.

A SwitchSet element can only contain SwitchSetRef or TrackGroupRef elements.

Because a TrackGroupRef element can only be contained within a SelectSet or SwitchSet, for every track group referenced, in one or more embodiment, there typically must exist at least one SelectSet or SwitchSet element. Tables I. and II., provided below provides an exemplary overview of Composition and Track Set schema.

TABLE I

| Element or Attribute name | Description | Type | Cardinality Use/default |
|---|---|---|---|
| Compositions | The root element that carries Composition, SwitchSet, and SelectSet elements. | complex | [0 . . . 1] |
| @trackGroupBaseURL | The location of the underlying presentation description document. Concatenated with any Composition @trackGroupBaseURL. | xs:anyURI | O |
| Composition | An element representing a single Composition with descriptive elements and a number of track set reference elements. | complex | [1 . . . N] |
| @trackGroupBaseURL | The location of the underlying presentation description document. Concatenated with any TrackSetRef @trackGroupURL. | xs:anyURI | O |
| @metadataURL | The location of additional metadata for the Composition. | xs:anyURI | O |
| @wireFormat | The container format used for sending audio or video media samples. The value of this string is be one of "MPEG2-TS", "MP4", or "PIFF". | xs:string | O |
| @isAdultContent | An informal Adult Content flag available for unrated content. If Rating elements exist, this is to be used for regions without ratings. | xs:boolean | O |
| Title | An element containing title information. | complex | [0 . . . N] |
| @lang | The RFC 5646 identifier for the language of the @headline and @summary values. | xs:string | R |
| @headline | A brief title headline. | xs:string | R |
| @summary | Summary information about the title. | xs:string | O |
| @contentIdURL | The location of any additional content identification information. | xs:anyURI | O |
| Copyright | An element containing copyright information. | complex | [0 . . . N] |
| @lang | The RFC 5646 identifier for the language of the other attributes. | xs:string | R |
| @statement | The copyright statement (e.g. "All rights reserved"). | xs:string | R |
| @publisher | The name of the publishing organization. | xs:string | R |
| @pubDate | The copyright date. | xs:date | O |
| DRM | An element containing digital rights management system information. | complex | [0 . . . N] |
| @protectionURN | The identifier for the protection scheme. Can be a urn:uuid value. | xs:anyURI | R |
| @protectionData | The opaque data for the given scheme. | xs:base64 Binary | R |

TABLE I-continued

| Element or Attribute name | Description | Type | Cardinality Use/default |
|---|---|---|---|
| @protectionScheme4CC | A four character code for the protection scheme. | xs:string | O |
| Compatibility | An element containing terminal compatibility information. | complex | [0 ... N] |
| @type | A compatibility type identifier. | xs:string | R |
| @parameters | Additional parameters for the compatibility type. | xs:string | O |
| Rating | An element containing content rating information. | complex | [0 ... N] |
| @region | The region of the rating system. | xs:string | R |
| @system | The rating system being used. | xs:string | R |
| @value | The value of the rating. | xs:string | R |
| @reason | The reason(s) for the rating. | xs:string | O |
| @imageURL | The location of any image associated with the rating. | xs:anyURI | O |
| DefaultRef | A list of @refId values indicating default SelectSetRef, SwitchSetRef, or TrackGroupRef choices to make in SwitchSet and SelectSet elements. | unsignedInt | [0 ... N] |
| TrackSetRef | An element that references either a SelectSet or a SwitchSet and provides descriptive elements along with an optional default selection configuration. | complex | [1 ... N] |
| @setIdRef | The id of the SwitchSet or SelectSet being referenced. | unsignedInt | R |
| @trackGroupURL | Concatenated with any containing Composition @trackGroupBaseURL. | xs:anyURI | O |
| @trackGroupPeriodStart | If the track group presentation contains more than one period, this value is employed to disambiguate. | xs:duration | O |
| @mediaType | The media type of all tracks in the track set. The value of this string is be one of "audio", "video", "text", or "subtitles". | xs:string | R |
| SwitchSet | Contains references to other SwitchSet elements and/or presentation layer track groups. | complex | [0 ... N] |
| SwitchSetRef | References a SwitchSet. | complex | [0 ... N] |
| @refId | A unique id for use in default selection. | unsignedInt | R |
| @setIdRef | The id of the SwitchSet being referenced | unsignedInt | R |
| TrackGroupRef | References a track group in a separate presentation description document. | complex | [0 ... N] |
| @refId | A unique id for use in default selection. | unsignedInt | R |
| @groupIdRef | The id of the SelectSet being referenced | unsignedInt | R |
| SelectSet | Contains references to other Select or SwitchSet elements and/or presentation layer track groups. | complex | [0 ... N] |
| SelectSetRef | References a SelectSet. | complex | [0 ... N] |
| @refId | A unique id for use in default selection. | unsignedInt | R |
| @setIdRef | The id of the SelectSet being referenced | unsignedInt | R |
| SwitchSetRef | References a SwitchSet. | complex | [0 ... N] |
| @refId | A unique id for use in default selection. | unsignedInt | R |
| @setIdRef | The id of the SwitchSet being referenced | unsignedInt | R |
| TrackGroupRef | References a track group in a separate presentation description document. | complex | [0 ... N] |

TABLE I-continued

| Element or Attribute name | Description | Type | Cardinality Use/default |
|---|---|---|---|
| @refId | A unique id for use in default selection. | unsignedInt | R |
| @groupIdRef | The group number of the track group being referenced. | unsignedInt | R |

TABLE II

```xml
<?xml version="1.0" encoding="UTF-8"?>
<xs:schema
    xmlns:xs="http://www.w3.org/2001/XMLSchema"
    xmlns="urn:microsoft:ns:Media:PresentationCompositions:2010"
    targetNamespace="urn:microsoft:ns:Media:PresentationCompositions:2010"
    attributeFormDefault="unqualified"
    elementFormDefault="qualified">
    <xs:annotation>
        <xs:appinfo>Media Presentation Compositions</xs:appinfo>
        <xs:documentation xml:lang="en">
            This Schema defines Media Presentation Compositions!
        </xs:documentation>
    </xs:annotation>
    <!-- Compositions: main element -->
    <xs:element name="Compositions" type="CompositionsType"/>
    <!-- The Compositions element contains composition and track set elements -->
    <xs:complexType name="CompositionsType">
        <xs:sequence>
            <xs:element name="Composition" type="CompositionType"
                        minOccurs="1" maxOccurs="unbounded"/>
            <xs:element name="SwitchSet" type="SwitchSetType"
                        minOccurs="0" maxOccurs="unbounded"/>
            <xs:element name="SelectSet" type="SelectSetType"
                        minOccurs="0" maxOccurs="unbounded"/>
        </xs:sequence>
        <xs:attribute name="trackGroupBaseUrl" type="xs:anyURI" use="optional"/>
        <xs:anyAttribute namespace="##other" processContents="lax"/>
    </xs:complexType>
    <!-- Composition to specify info and a set of track sets for an authored composition -->
    <xs:complexType name="CompositionType">
        <xs:sequence>
            <xs:element name="Title" minOccurs="0" maxOccurs="unbounded">
                <xs:complexType>
                    <xs:attribute name="lang" type="xs:string" use="required"/>
                    <xs:attribute name="headline" type="xs:string" use="required"/>
                    <xs:attribute name="summary" type="xs:string" use="optional"/>
                    <xs:attribute name="contentIdURL" type="xs:anyURI" use="optional"/>
                    <xs:anyAttribute namespace="##other" processContents="lax"/>
                </xs:complexType>
            </xs:element>
            <xs:element name="Copyright" minOccurs="0" maxOccurs="unbounded">
                <xs:complexType>
                    <xs:attribute name="lang" type="xs:string" use="required"/>
                    <xs:attribute name="statement" type="xs:string" use="required"/>
                    <xs:attribute name="publisher" type="xs:string" use="required"/>
                    <xs:attribute name="pubDate" type="xs:date" use="optional"/>
                    <xs:anyAttribute namespace="##other" processContents="lax"/>
                </xs:complexType>
            </xs:element>
            <xs:element name="DRM" minOccurs="0" maxOccurs="unbounded">
                <xs:complexType>
                    <xs:attribute name="protectionURN" type="xs:anyURI" use="required"/>
                        <!-- protectionURN can be a system UUID -->
                    <xs:attribute name="protectionData" type="xs:base64Binary" use="required"/>
                    <xs:attribute name="protectionScheme4CC" type="xs:string" use="optional"/>
                    <xs:attribute name="description" type="xs:string" use="optional"/>
                    <xs:anyAttribute namespace="##other" processContents="lax"/>
                </xs:complexType>
            </xs:element>
            <xs:element name="Compatibility" minOccurs="0" maxOccurs="unbounded">
                <xs:complexType>
                    <xs:attribute name="type" type="xs:string" use="required"/>
                    <xs:attribute name="parameters" type="xs:string" use="optional"/>
                    <xs:anyAttribute namespace="##other" processContents="lax"/>
                </xs:complexType>
            </xs:element>
```

TABLE II-continued

```
            <xs:element name="Rating" minOccurs='0' maxOccurs="unbounded">
                <xs:complexType>
                    <xs:attribute name="region" type="xs:string" use="required"/>
                    <xs:attribute name="system" type="xs:string" use="required"/>
                    <xs:attribute name="value" type="xs:string" use="required"/>
                    <xs:attribute name="reason" type="xs:string" use="optional"/>
                    <xs:attribute name="imageURL" type="xs:anyURI" use="optional"/>
                </xs:complexType>
            </xs:element>
            <xs:element name="TrackSetRef" type="TrackSetRefType"
                        minOccurs="1" maxOccurs="unbounded"/>
            <xs:element name="DefaultRef" type="xs:unsignedInt"
                        minOccurs="0" maxOccurs="unbounded"/>
            <xs:any namespace="##other" processContents="lax"/>
        </xs:sequence>
        <xs:attribute name="trackGroupBaseUrl" type="xs:anyURI" use="optional"/>
        <xs:attribute name="metadataUrl" type="xs:anyURI" use="optional"/>
        <xs:attribute name="wireFormat" use="optional">
            <xs:simpleType>
                <xs:restriction base="xs:string">
                    <xs:enumeration value="MP2TS"/>
                    <xs:enumeration value="MP4"/>
                    <xs:enumeration value="PIFF"/>
                </xs:restriction>
            </xs:simpleType>
        </xs:attribute>
        <xs:attribute name="isAdultContent" type="xs:boolean" use="optional"/>
        <xs:anyAttribute namespace="##other" processContents="lax"/>
    </xs:complexType>
    <!-- Track sets -->
    <!-- TrackSetRef for referencing a track set by its unique id number -->
    <xs:complexType name="TrackSetRefType">
        <xs:attribute name="setIdRef" type="xs:unsignedInt" use="required"/>
        <!-- trackGroupUrl concatenated with trackGroupBaseUrl; result must not be empty -->
        <xs:attribute name="trackGroupUrl" type="xs:anyURI" use="optional"/>
        <!-- trackGroupPeriodStart required if TrackGroupRef has more than one period -->
        <xs:attribute name="trackGroupPeriodStart" type="xs:duration" use="optional"/>
        <xs:attribute name="mediaType" use="required">
            <xs:simpleType>
                <xs:restriction base="xs:string">
                    <xs:enumeration value="audio"/>
                    <xs:enumeration value="video"/>
                    <xs:enumeration value="subtitles"/>
                    <xs:enumeration value="text"/>
                </xs:restriction>
            </xs:simpleType>
        </xs:attribute>
        <xs:attribute name="description" type="xs:string" use="optional"/>
        <xs:anyAttribute namespace="##other" processContents="lax"/>
    </xs:complexType>
    <!-- SwitchSet of tracks that can be seamlessly switched -->
    <xs:complexType name="SwitchSetType">
        <xs:sequence>
            <!-- must be at least one -->
            <!-- All track groups within sets must be of the same MediaType -->
            <xs:element name="TrackGroupRef" type="TrackGroupRefType"
                        minOccurs="0" maxOccurs="unbounded"/>
            <xs:element name="SwitchSetRef" type="SwitchSetRefType"
                        minOccurs="0" maxOccurs="unbounded"/>
        </xs:sequence>
        <xs:attribute name="setId" type="xs:unsignedInt" use="required"/>
        <!-- unique setId -->
    </xs:complexType>
    <!-- SelectSet of tracks that cannot be seamlessly switched -->
    <xs:complexType name="SelectSetType">
        <xs:sequence>
            <!-- must be at least one -->
            <!-- All track groups within sets must be of the same MediaType -->
            <xs:element name="TrackGroupRef" type="TrackGroupRefType"
                        minOccurs="0" maxOccurs="unbounded"/>
            <xs:element name="SwitchSetRef" type="SwitchSetRefType"
                        minOccurs="0" maxOccurs="unbounded"/>
            <xs:element name="SelectSetRef" type="SelectSetRefType"
                        minOccurs="0" maxOccurs="unbounded"/>
        </xs:sequence>
        <xs:attribute name="setId" type="xs:unsignedInt" use="required"/>
        <!-- unique setId -->
    </xs:complexType>
```

TABLE II-continued

```
    <!-- SelectSet reference -->
    <xs:complexType name="SelectSetRefType">
        <!-- refId is used for default selection path specification -->
        <xs:attribute name="refId" type="xs:unsignedInt" use="required"/>
        <xs:attribute name="setIdRef" type="xs:unsignedInt" use="required"/>
    </xs:complexType>
    <!-- SwitchSet reference -->
    <xs:complexType name="SwitchSetRefType">
        <!-- refId is used for default selection path specification -->
        <xs:attribute name="refId" type="xs:unsignedInt" use="required"/>
        <xs:attribute name="setIdRef" type="xs:unsignedInt" use="required"/>
    </xs:complexType>
    <!-- TrackGroup reference -->
    <xs:complexType name="TrackGroupRefType">
        <!-- refId is used for default selection path specification -->
        <xs:attribute name="refId" type="xs:unsignedInt" use="required"/>
        <xs:attribute name="groupIdRef" type="xs:unsignedInt" use="required"/>
    </xs:complexType>
</xs:schema>
```

With respect to presentations, additional information is provided to specify the use of single-track partial Representations. The extension optionally inserts a single TrackGroupInfo element in a Period element (as allowed by the MPD schema extensibility). This element contains a list of elements describing Representation groups as denoted by their @group attribute value. In addition, it contains any number of elements describing arbitrary timelines for the Segments in Representation groups for those cases where constant duration Segments cannot be sourced.

With respect to schema description terminology, in this schema, element instances can be referenced by other element instances in a different part of the XML hierarchy. These elements contain unique numeric identifiers that are used for the reference. The referring elements contain an attribute with the suffix "Ref" to hold the reference identifier value.

With respect to RepresentationGroup, when a RepresentationGroup element is present for a given Representation group, all Representations in the associated group must be partial Representations with a single track of the same media component type (e.g. audio, video, or text). Therefore, a RepresentationGroup must not specify group zero.

Further, all such Representations of the same group number must be seamlessly switchable. In other words, the requirements of the MPD Period attributes @segmentAlignmentFlag and @bitstreamSwitchingFlag both being true are met even though those attributes may be false for the containing Period.

The @groupRef attribute declares which Representation group is being described.

The optional @timelineIdRef attribute is used to reference a particular timeline (see below). If this attribute is absent, then one of the standard Representation Url elements must be present in all Representations of the group.

The RepresentationGroup declares the media component type of all the tracks in the group by containing one and only one of the AudioRepInfo, VideoRepInfo, or TextRepInfo elements. These elements contain additional attributes that are unique to their types.

An optional list of up to four SegmentRequestVariant elements can also be present. This list allows a mapping of the four request types to arbitrary strings to be substituted into the request URL. These types allow requesting a full segment (FULL), only the information header of a segment (INFO), only the sample data part of a segment (SAMP), or a segment that contains INFO but followed by only the key frames of the SAMP (KEYF). This last type is particularly useful for fast forward and reverse modes.

The optional @switchableSetId attribute allows multiple RepresentationGroup elements to be associated into a single switchable set. For example, if two camera angles are presented by two different Representation groups, but all the tracks are seamlessly switchable, the two RepresentationGroup elements would have identical @switchableSetId values.

If any Segment initialization data is common to all tracks in the Representation group, the common InitializationSegmentURL element can reside in the RespresentationGroup instead of in the individual Representation elements. Also in this case, the initialization data can be embedded directly in the @segmentInitData attribute instead of having an InitializationSegmentURL element.

With respect to SegmentTimeline, the optional SegmentTimeline element provides a way to express non-regular Representation segment durations. The element instances stand alone and have a unique @id attribute value to allow multiple RepresentationGroup elements to refer to the same timeline. Typically a set of switchable tracks will all refer to the same timeline.

Times and durations in the timeline are expressed as rational numbers in seconds. The @timescale value provides the denominator while the time and duration values provide the numerator.

The SegmentTimeline contains a list of S elements with each specifying a start time @t, a duration @d, and an optional @r for the a number of times the duration is to be repeated for a contiguous set of Segments.

The repeat value is zero based and defaults to zero.

The <S> elements are sorted by their @t attribute values.

The @sourceUrlTemplate attribute provides a template for creating Segment request URLs. This template contains either a $Time$ or $Index$ substitution tag. The $Time$ tag is replaced by the segment start time while the $Index$ substitution tag is replaced by the segment index into the timeline.

The @sourceUrlTemplate can optionally contain $Bandwidth$, $PeriodBaseURL$, $RepBaseURL$, or $SegReqType$ substitution tags. The $Bandwidth$ is replaced by the Representation @bandwidth attribute value for the chosen track in the group. The base URL tags allow arbitrary placement of the MPD Period and Representation @baseURL attribute values in the resulting resource URL value. The $SegReqType$ tag is replaced by one of the SegmentRequestVariant types.

The following tables, Table III. and Table IV. Relate to an exemplary overview of manifest and/or MPD schema extensions.

TABLE III

| Element or Attribute name | Description | Type | Cardinality Use/default |
| --- | --- | --- | --- |
| TrackGroupInfo | An optional single element to contain a set of RepresentationGroup and SegmentTimeline elements. | complex | [0 . . . 1] |
| RepresentationGroup | Additional information about a set of single-track partial Representations with the same @group attribute value. | complex | [1 . . . N] |
| @groupRef | The associated Representation @group number. | unsignedInt | R |
| @timelineIdRef | The associated Timeline @id number. | unsignedInt | O |
| @switchableSetId | A numeric id to associate multiple Representation groups that are seamlessly switchable between all tracks in the groups. | unsignedInt | O |
| InitializationSegmentURL | An element common for all tracks in the group. The Representations in the group need not have an InitializationSegmentURL element when it is present here. | MPD | O |
| @segmentInitData | Embedded data for taking the place of the InitializationSegmentURL element and only present in its absence. | hexBinary | O |
| AudioRepInfo | Declares Representation track media component type to be audio and provides additional attributes. | complex | [choice] |
| @nalUnitLengthFieldSize | MP4/15 NAL unit length field size in octets. | unsignedInt | O/4 |
| @sampleRateHz | Audio sample rate in Hertz. | unsignedInt | R |
| @channels | Number of audio channels. | unsignedInt | R |
| @packetSize | Block alignment in octets. | unsignedInt | R |
| VideoRepInfo | Declares Representation track media component type to be video and provides additional attributes. | complex | [choice] |
| @nalUnitLengthFieldSize | MP4/15 NAL unit length field size in octets | unsignedInt | O/4 |
| TextRepInfo | Declares Representation track media component type to be video and provides additional attributes. | complex | [choice] |
| @purpose4CC | FourCC code to declare the purpose of the text. | string | O |
| SegmentRequestVariant | A list of possible Segment request variants. | complex | [0 . . . 4] |
| @type4CC | FourCC code to declare the type of the variant. These types are FULL, INFO, SAMP, KEYF. | string | R |
| @urlTag | For the desired type of request, the string to be substituted in the SegmentTimeline @sourceUrlTemplate $SegReqType$ tag. | string | R |

TABLE III-continued

| Element or Attribute name | Description | Type | Cardinality Use/default |
|---|---|---|---|
| SegmentTimeline | Segment timeline information for a switchable set of Representations. | complex | [1 ... N] |
| @id | The id to be referenced in the RepresentationGroup @timelineIdRef attribute. | unsignedInt | R |
| @timescale | The number of timeline units per second. This forms the denominator for expressing time in seconds as a rational number. | unsignedInt | R |
| @sourceUrlTemplate | A URL template to be used in place of the Url or UrlTemplate elements available in the Representations in the group. Requires substitution tag of $Time$ or $Index$. Optional tags $Bandwidth$, $PeriodBaseURL$, $RepBaseURL$, and $SegReqType$. | anyURI | R |
| S | Time line item element. Each item specifies a start time, duration, and number of times the duration is to be repeated for a contiguous set of Segments. These elements are sorted by their @t attribute values. | complex | [1 ... N] |
| @t | Time, in @timescale units, the first Segment in the series starts relative to the beginning of the period. | unsignedInt | R |
| @d | Duration, in @timescale units, of each Segment in the series. | unsignedInt | R |
| @r | Repeat count of the number of Segments in the series after the first and with the same @duration. | unsignedInt | O/0 |

TABLE IV

```
<?xml version="1.0" encoding="UTF-8"?>
<xs:schema
    xmlns:xs="http://www.w3.org/2001/XMLSchema"
    xmlns="urn:3GPP:ns:PSS:AdaptiveHTTPStreamingMPD:2009"
    targetNamespace="urn:3GPP:ns:PSS:AdaptiveHTTPStreamingMPD:2009"
    attributeFormDefault="unqualified"
    elementFormDefault="qualified"
    xmlns:pss="urn:3GPP:ns:PSS:AdaptiveHTTPStreamingMPD:2009">
    <!-- TrackGroupInfo: main element embedded in pss:PeriodType -->
    <xs:redefine schemaLocation="3GPP-MPD-006.xsd">
        <xs:complexType name="PeriodType">
            <xs:complexContent>
                <xs:extension base="pss:PeriodType">
                    <xs:sequence>
                        <xs:element name="TrackGroupInfo" type="TrackGroupInfoType"
                            minOccurs="0" maxOccurs="1"/>
                    </xs:sequence>
                </xs:extension>
            </xs:complexContent>
        </xs:complexType>
    </xs:redefine>
    <!-- TrackGroupInfo: set of multiple RepresentationGroup
         and optional SegmentTimeline elements -->
    <xs:complexType name="TrackGroupInfoType">
        <xs:sequence>
            <xs:element name="RepresentationGroup" type="RepresentationGroupType"
```

TABLE IV-continued

```
                    minOccurs="1" maxOccurs="unbounded"/>
        <xs:element name="SegmentTimeline" type="SegmentTimelineType"
                    minOccurs="0" maxOccurs="unbounded"/>
        <xs:any namespace="##other" processContents="lax"
                    minOccurs="0" maxOccurs="unbounded"/>
    </xs:sequence>
</xs:complexType>
<!-- RepresentationGroup: group description element -->
<!-- A group is constrained to have switchable single-track
            Representation elements with a common media type -->
<!-- Segment request variant 4CC values -->
<xs:simpleType name="SegmentRequest4CCEnumType">
    <xs:restriction base="xs:string">
        <xs:enumeration value="FULL"/>
        <xs:enumeration value="INFO"/>
        <xs:enumeration value="SAMP"/>
        <xs:enumeration value="KEYF"/>
    </xs:restriction>
</xs:simpleType>
<xs:complexType name="RepresentationGroupType">
    <xs:sequence>
        <xs:choice> <!-- One and only one -->
            <xs:element name="AudioRepInfo" type="AudioRepInfoType"/>
            <xs:element name="VideoRepInfo" type="VideoRepInfoType"/>
            <xs:element name="TextRepInfo" type="TextRepInfoType"/>
            <xs:any namespace="##other" processContents="lax"/>
        </xs:choice>
        <xs:element name="SegmentRequestVariant" minOccurs="0" maxOccurs="4">
            <xs:complexType>
                <xs:attribute name="type4CC" type="SegmentRequest4CCEnumType"
use="required"/>
                <xs:attribute name="urlTag" type="xs:string" use="required"/>
            </xs:complexType>
        </xs:element>
        <xs:element name="InitializationSegmentURL" type="pss:UrlType"
                    minOccurs="0" maxOccurs="1"/>
    </xs:sequence>
    <xs:attribute name="groupRef" type="xs:unsignedInt" use="required"/>
    <xs:attribute name="timelineIdRef" type="xs:unsignedInt" use="optional"/>
    <xs:attribute name="switchableSetId" type="xs:unsignedInt" use="optional"/>
    <xs:attribute name="segmentInitData" type="xs:hexBinary" use="optional"/>
    <xs:attribute name="protectionScheme4CC" type="xs:string" use="optional"/>
    <xs:anyAttribute namespace="##other" processContents="lax"/>
</xs:complexType>
<!-- Audio Representation information -->
<xs:complexType name="AudioRepInfoType">
    <xs:attribute name="nalUnitLengthFieldSize" type="xs:unsignedInt"
use="optional"/>
    <xs:attribute name="sampleRateHz" type="xs:unsignedInt" use="required"/>
    <xs:attribute name="channels" type="xs:unsignedInt" use="required"/>
    <xs:attribute name="packetSize" type="xs:unsignedInt" use="required"/>
    <xs:anyAttribute namespace="##other" processContents="lax"/>
</xs:complexType>
<!-- Video Representation information -->
<xs:complexType name="VideoRepInfoType">
    <xs:attribute name="nalUnitLengthFieldSize" type="xs:unsignedInt"
use="optional"
                    default="4"/>
    <xs:anyAttribute namespace="##other" processContents="lax"/>
</xs:complexType>
<!-- Text purpose 4CC values -->
<xs:simpleType name="TextPurpose4CCEnumType">
    <xs:restriction base="xs:string">
        <xs:enumeration value="SCMD"/> <!-- script command -->
        <xs:enumeration value="CHAP"/> <!-- chapter title -->
        <xs:enumeration value="CAPT"/> <!-- captions -->
        <xs:enumeration value="SUBT"/> <!-- subtitles -->
        <xs:enumeration value="DESC"/> <!-- description for hearing impared -->
        <xs:enumeration value="CTRL"/> <!-- control action -->
        <xs:enumeration value="DATA"/> <!-- unspecified data -->
    </xs:restriction>
</xs:simpleType>
<!-- Text Representation information -->
<xs:complexType name="TextRepInfoType">
    <xs:attribute name="purpose4CC" type="TextPurpose4CCEnumType"
use="required"/>
    <xs:anyAttribute namespace="##other" processContents="lax"/>
</xs:complexType>
<!-- SegmentTimeline to map Representation segments to specific Period-relative
times -->
```

TABLE IV-continued

```
<xs:complexType name="SegmentTimelineType">
    <xs:sequence>
        <xs:element name="S" minOccurs="1" maxOccurs=""unbounded" >
            <xs:complexType>
                <!-- start time in timescale units -->
                <xs:attribute name="t" type="xs:unsignedInt" use="required"/>
                <!-- duration in timescale units -->
                <xs:attribute name="d" type="xs:unsignedInt" use="required"/>
                <!-- repeat count (zero based) of additional durations -->
                <xs:attribute name="r" type="xs:unsignedInt" use="optional" default="0"/>
                <xs:anyAttribute namespace="##other" processContents="lax"/>
            </xs:complexType>
        </xs:element>
    </xs:sequence>
    <xs:attribute name="id" type="xs:unsignedInt" use="required"/>
    <xs:attribute name="timescale" type="xs:unsignedInt" use="required"/>
    <xs:attribute name="sourceUrlTemplate" type="xs:anyURI" use="optional"/>
    <!-- sourceUrlTemplate replaces Representation URLs;
            Must contain $Time$ or $Index$ substitution tag;
            Can contain $PeriodBaseURL$, $RepBaseURL$, $Bandwidth$, $SegReqType$
tags.
        -->
    </xs:complexType>
</xs:schema>
```

Regarding various embedded data schemes, MPD is further extended by defining an additional URI scheme for the InitializationSegmentURL and Url element @sourceURL xs:anyURI attribute. If the scheme is "embed://data", then the element contains a @data attribute of type xs:base64Binary containing the data.

This provides the option to reduce the number of additional HTTP GET requests employed to load all the description information completely.

Figure 9:
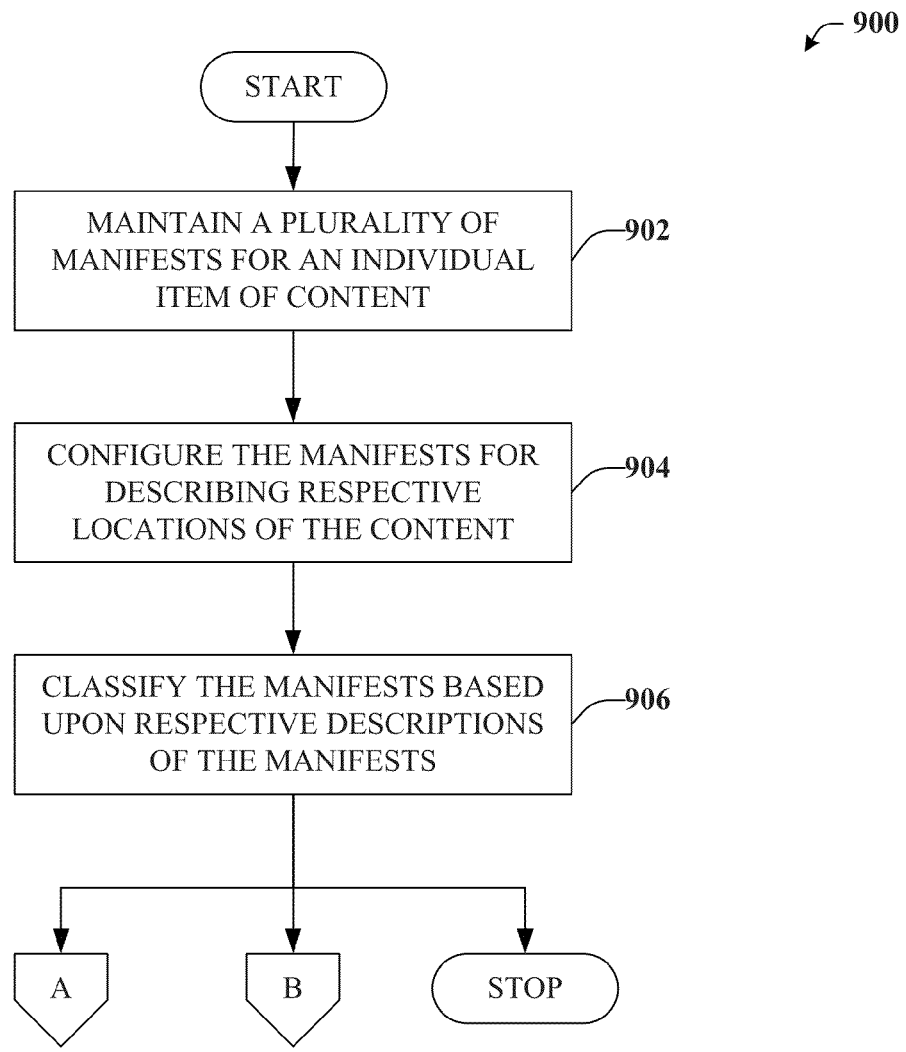
FIG. 9 is an exemplary non-limiting flow diagram for facilitating hypertext transfer protocol (HTTP) delivery of streaming content.
Figure 10:
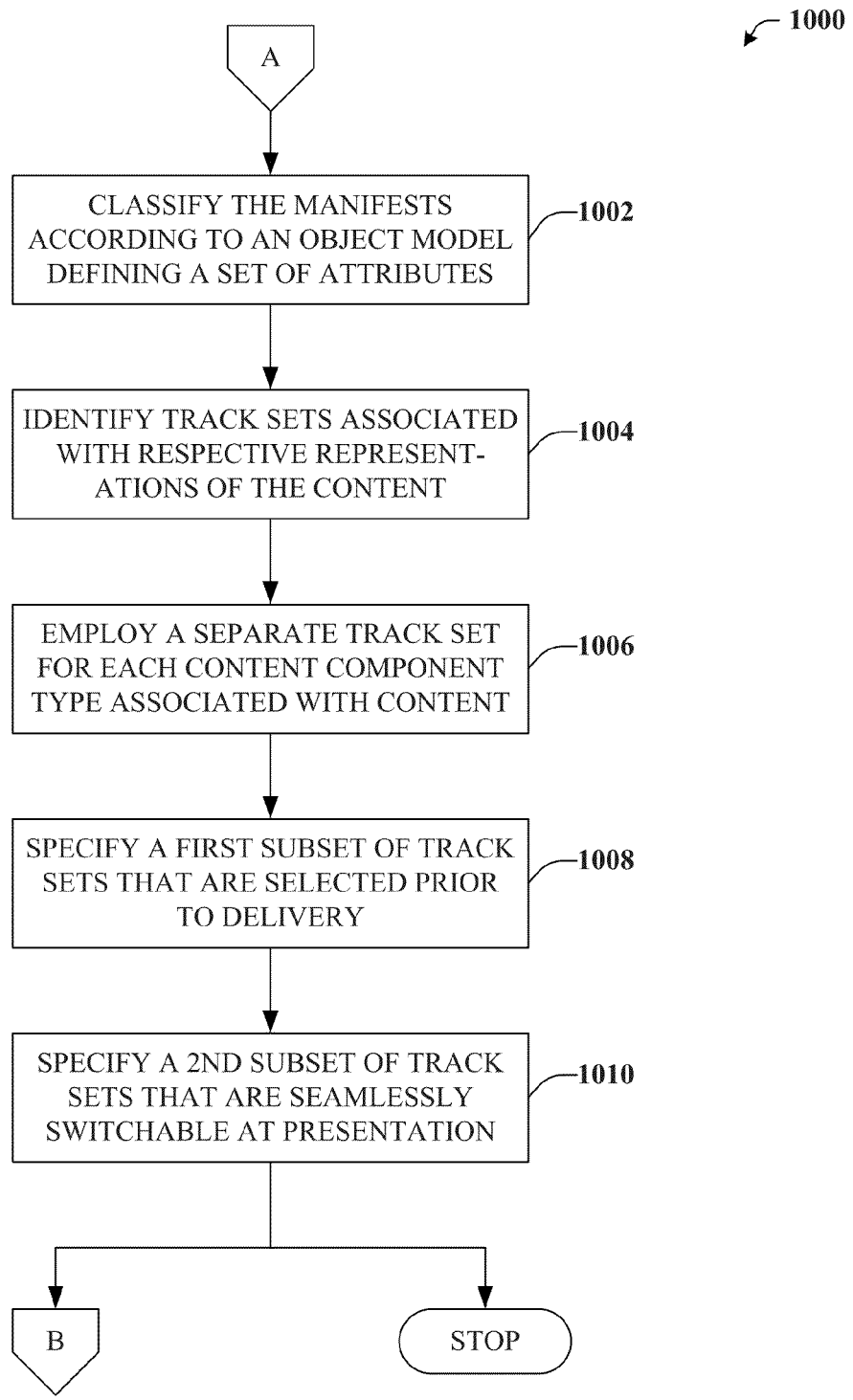
FIG. 10 is an exemplary non-limiting flow diagram for employing track sets and/or object models in connection with facilitating HTTP delivery of streaming content.
Figure 11:
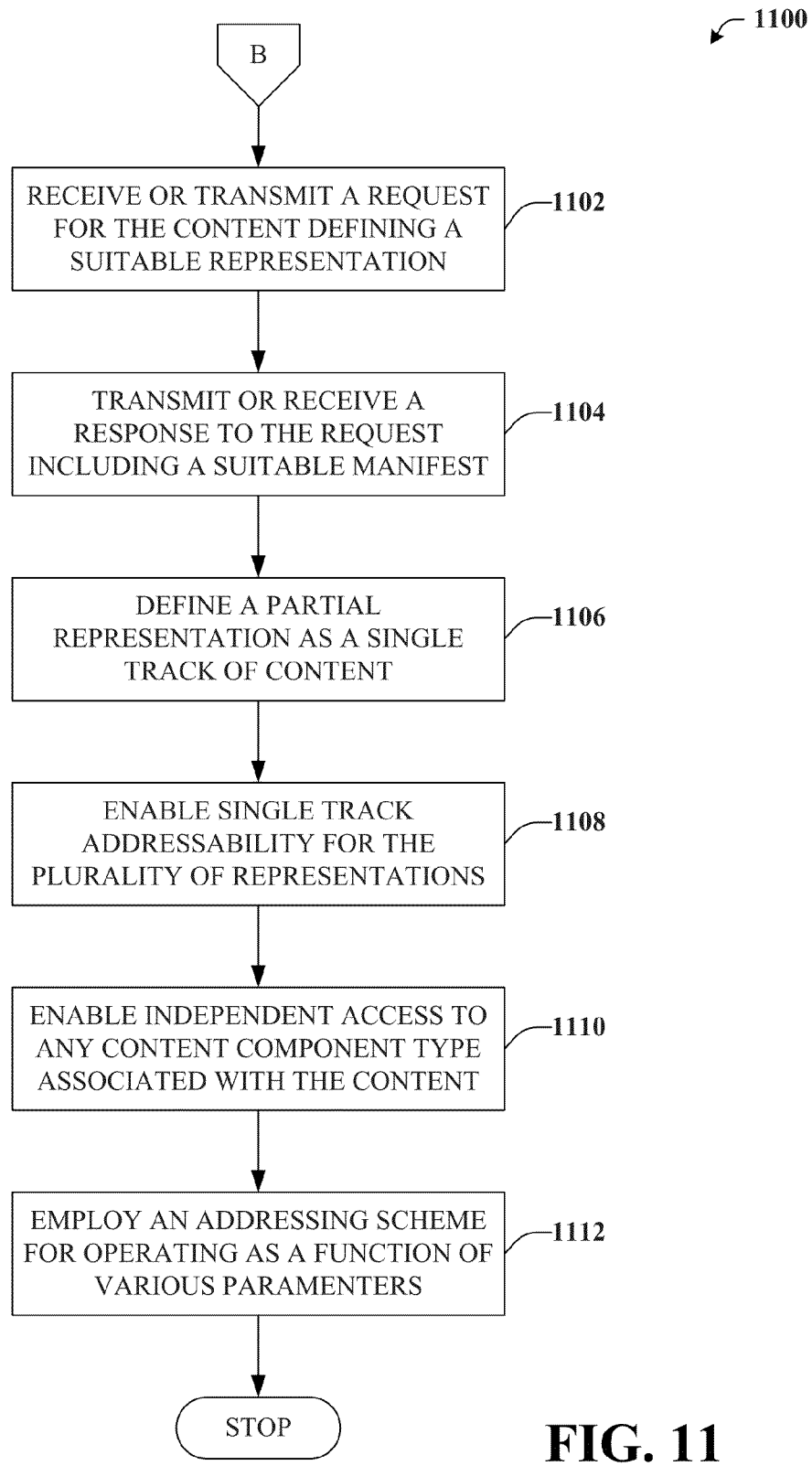
FIG. 11 is an exemplary non-limiting flow diagram for providing additional features or aspects in connection with facilitating HTTP delivery of streaming content.

FIGS. 9-11 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers.

Referring now to FIG. 9, exemplary method 900 for facilitating hypertext transfer protocol (HTTP) delivery of streaming content is depicted. Generally, at reference numeral 902, a plurality of manifests can be maintained for an individual item of content. Thus, while multiple items of content can exist, each such item of content can be associated with a plurality of manifests.

Accordingly, at reference numeral 904, the plurality of manifests can be configured for describing respective location of content segments associated with a plurality of representations of the content. Advantageously, each item of content can be associated with a plurality of representations, and each representation can be described by one or more manifest.

Thus, manifests can be optimized for particular end-user configurations. Moreover, at reference numeral 906, the plurality of manifests can be classified based upon respective descriptions of the plurality of manifests.

Turning now to FIG. 10, exemplary method 1000 for employing track sets and/or object models in connection with facilitating HTTP delivery of streaming content is illustrated. At reference numeral 1002, the plurality of manifests classified in connection with reference numeral 906 of FIG. 9, can be further classified according to an object model defining a set of attributes associated with the plurality of representations of the content.

Next to be described, at reference numeral 1004, track sets associated with respective representations of the content or a content segment can be identified. In accordance therewith, at reference numeral 1006, a first subset of track sets that are selected prior to delivery as selectable track sets can be specified. Moreover, at reference numeral 1008, a second subset of track sets that are seamlessly switchable during presentation as switchable track sets can be specified.

Referring to FIG. 11, exemplary method 1100 for providing additional features or aspects in connection with facilitating HTTP delivery of streaming content is depicted. At reference numeral 1102, a request for the content can be transmitted (e.g., by a client) or received (e.g., by a server). The request can include a set of characteristics or attributes defining a suitable representation of the content. Likewise, at reference numeral 1104, a response to the request can be transmitted or received. The response can include, e.g., a suitable manifest associated with the suitable representation of the content.

In one or more embodiments, a partial representation of at least one of the plurality of representations can be defined as a single track of content, which is detailed in connection with reference numeral 1106. Accordingly, at reference numeral 1108, single track addressability for the plurality of representations can be enabled.

Furthermore, at reference numeral 1110, independent access to any content component type (e.g., audio content, video content . . . ) associated with the content or the plurality of representations can be enabled. Last to be described, at reference numeral 1112, an addressing scheme can be employed for operating as a function of at least one of a track set, an attribute associated with the content, content segment, or a representation thereof, or a time associated with the content, content segment, or a representation thereof.

Exemplary Networked and Distributed Environments

One of ordinary skill in the art can appreciate that the various embodiments of dynamic composition described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of the subject disclosure.

Figure 12:
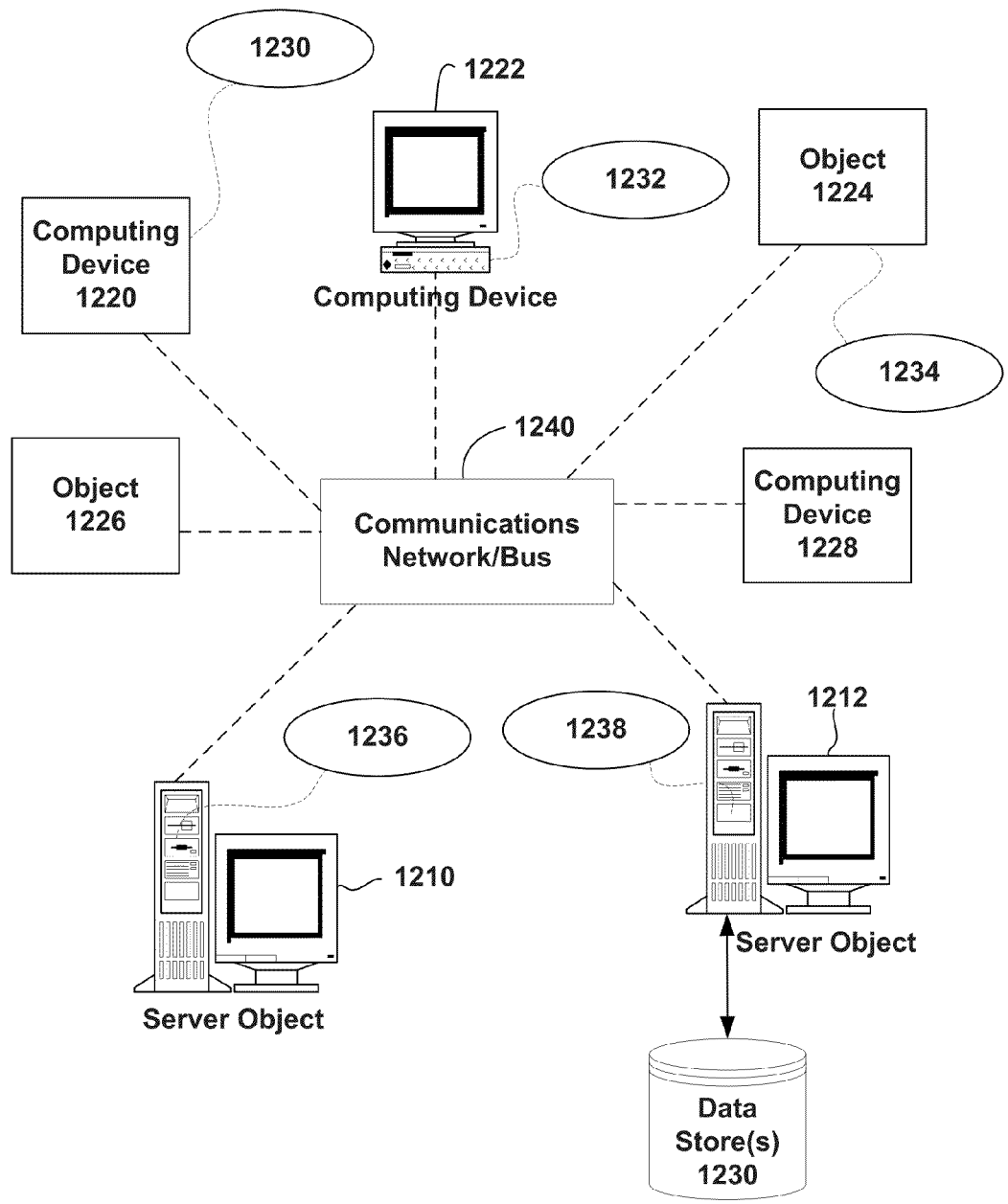
FIG. 12 is a block diagram representing an exemplary non-limiting networked environment in which the various embodiments may be implemented.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as PDAs, audio/video devices, mobile phones, MP3 players, personal computers, laptops, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, network 1240 may comprise other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the smooth streaming provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the dynamic composition systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances. Any of these computing devices may be processing data, or requesting transaction services or tasks that may implicate the techniques for dynamic composition systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing read set validation or phantom checking can be provided standalone, or distributed across multiple computing devices or objects.

In a network environment in which the communications network/bus 1240 is the Internet, for example, the computing objects 1210, 1212, etc. can be Web servers with which the client computing objects or devices 1220, 1222, 1224, 1226, 1228, etc. communicate via any of a number of known protocols, such as the hypertext transfer protocol (HTTP). Servers 1210, 1212, etc. may also serve as client computing objects or devices 1220, 1222, 1224, 1226, 1228, etc., as may be characteristic of a distributed computing environment.

Exemplary Computing Device

As mentioned, advantageously, the techniques described herein can be applied to any device where it is desirable to perform dynamic composition. It is to be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 2 is but one example of a computing device. Additionally, a database server can include one or more aspects of the below general purpose computer, such as a media server or consuming device for the dynamic composition techniques, or other media management server components.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 13:
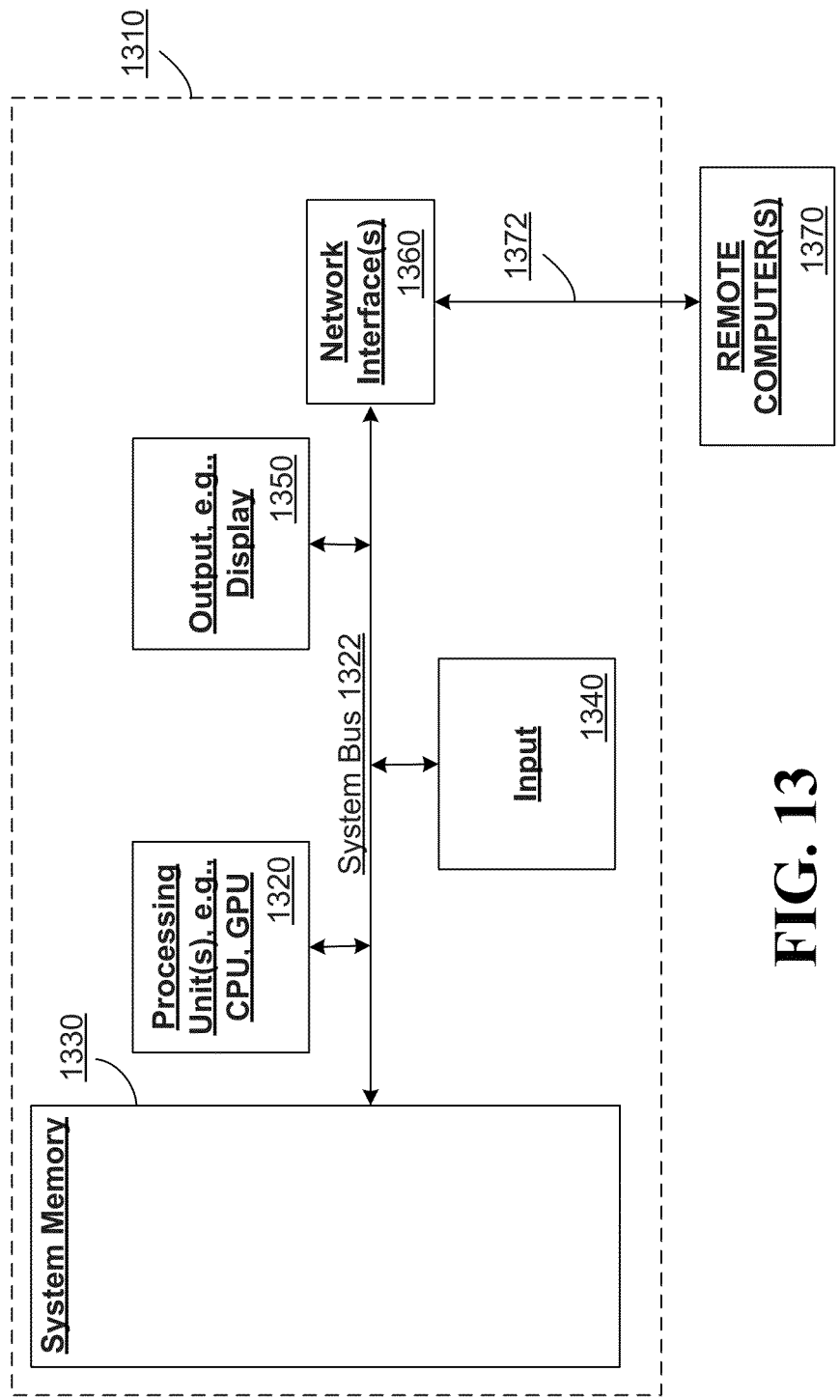
FIG. 13 is a block diagram representing an exemplary non-limiting computing system or operating environment in which the various embodiments may be implemented.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing environment 1300 be interpreted as having any dependency or requirement relating to any one or combination of components illustrated in the exemplary operating environment 1300.

With reference to FIG. 13, an exemplary remote device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, memory 1330 may also include an operating system, application programs, other program modules, and program data.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the dynamic composition techniques. Thus, embodiments herein are contemplated from the standpoint of an API (or other software object), as well as from a software or hardware object that implements one or more aspects of the smooth streaming described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather should be construed in breadth, spirit and scope in accordance with the appended claims.

What is claimed is:

1. A system that facilitates hypertext transfer protocol (HTTP) delivery of streaming media, the system comprising:
at least one processor and at least one memory;
the at least one memory including:
a manifest component that maintains multiple manifests for a single item of content, wherein each manifest included in the multiple manifests describes at least one location of one or more content segments associated with one or more representations of the content, each manifest associated with a particular configuration of the single item of content;
a composition component that organizes the multiple manifests in accordance with descriptions of the multiple manifests and selects a particular manifest from the multiple manifests based upon data included in a request for the content; and
a track set component that identifies track sets available as alternative representations of the content or content segment, the track sets used to adjust the HTTP delivery of the streaming media,
wherein the track sets are classified as one of selectable or switchable, wherein a selectable track set is selectable prior to delivery and a switchable track set is seamlessly switchable with respect to another switchable track set during presentation.

2. The system of claim 1, wherein each manifest further describes a set of attributes associated with the one or more representation of the content.

3. The system of claim 1, wherein the composition component organizes the multiple manifests in accordance with an object model that defines a set of attributes associated with one or more representations of the content or content segment thereof.

4. The system of claim 1 wherein a track set is associated with one and only one content component type; and wherein each content component type is one of audio, video, subtitles or other text, or an enhanced layer of video or audio.

5. The system of claim 1, wherein the composition component facilitates composition of a new manifest included in the multiple manifests based upon a set of attributes that correspond to features of one or more track sets identified by the track set component.

6. The system of claim 5, wherein the new manifest is optimized in connection with delivery or presentation based upon at least one of a particular device or particular devices or capabilities thereof, a particular form factor, a particular network or network condition, or a particular setting or preference or a particular set of settings or preferences.

7. The system of claim 1, further comprising a storage component that maintains at least one representation of the content or content segment thereof.

8. The system of claim 7, wherein the at least one representation includes at least one partial representation defined as a single track.

9. The system of claim 7, wherein the storage component stores the at least one representation in a manner that supports addressability of individual partial representation or individual tracks of the content, and further configured to support independent access to content component types associated with the content.

10. The system of claim 7, wherein the storage component stores the at least one representation by way of protected interoperable file format (PIFF).

11. The system of claim 1, wherein the at least one location is described by a uniform resource locator (URL).

12. The system of claim 11, wherein the URL is determined as a function of at least one of a track set; an attribute associated with the content, a particular content segment, or a particular track; or a time associated with the content, a particular content segment, or a particular track.

13. A system that facilitates presentation of streaming content delivered by way of hypertext transfer protocol (HTTP), comprising:

at least one processor and a computer-readable storage medium;
the computer-readable storage medium including the following processor-executable components:
a selection component that receives a selected manifest that is selected from amongst multiple manifests, wherein the selected manifest describes at least one location of one or more content segments associated with a particular representation of content, each manifest associated with a particular configuration of the particular representation of content;
a communication component that retrieves the particular representation according to a streaming protocol based upon information included in the selected manifest; and
a presentation component that presents at least a portion of a particular representation, and supports real-time seamless switching of tracks associated with a presentation of the content or the particular representation based upon received input, wherein the real-time seamless switching of tracks is based on track sets,
wherein the track sets are classified as one of selectable or switchable, wherein a selectable track set is selectable prior to delivery and a switchable track set is seamlessly switchable with respect to another switchable track set during presentation.

14. The system of claim 13, wherein the selection component determines the selected manifest based upon at least one of (1) a local configuration that relates to at least one of device or network configuration, device or network state, device or network settings or preferences, or an indication of options, features, or attributes in connection with the content; or (2) a recommendation received in response to a request for the content, wherein the request includes all or a portion of the local configuration.

15. A method implemented on a computing device for facilitating hypertext transfer protocol (HTTP) delivery of streaming content, the computing device having at least one processor, the method comprising:
maintaining a plurality of manifests for an individual item of content;
configuring the plurality of manifests for describing respective locations of content segments associated with a plurality of representations of the content, each manifest associated with a particular configuration of the content;
maintaining at least one representation of the content or content segment;
classifying the plurality of manifests based upon respective descriptions of the plurality of manifests;
selecting a particular manifest from the plurality of manifests based upon data included in a request for the content; and
identifying track sets associated with respective representations of the content or a content segment, the track sets used to adjust the HTTP delivery of the streaming content, wherein the track sets are classified as one of selectable or switchable, wherein a selectable track set is selectable prior to delivery and a switchable track set is seamlessly switchable with respect to another switchable track set during presentation.

16. The method of claim 15, further comprising at least one of the following:
classifying the plurality of manifests according to an object model defining a set of attributes associated with the plurality of representations of the content;
employing a separate track set for each content component type associated with the content;
specifying a first subset of the track sets that are selected prior to delivery as selectable track sets;
specifying a second subset of the track sets that are seamlessly switchable during presentation as switchable track sets;
receiving a request for the content including a set of characteristics defining a suitable representation of the content;
transmitting a request for the content including a set of characteristics defining a suitable representation of the content;
receiving a response to a request including a suitable manifest associated with the suitable representation of the content;
transmitting a response to a request including a suitable manifest associated with the suitable representation of the content;
defining a partial representation of at least one of the plurality of representations as a single track of content;
enabling single track addressability for the plurality of representations;
enabling independent access to any content component type associated with the content or the plurality of representations; or
employing an addressing scheme for operating as a function of at least one of a track set, an attribute associated with the content, content segment, or a representation thereof, or a time associated with the content, content segment, or a representation thereof.

* * * * *